United States Patent
Lu et al.

(10) Patent No.: US 9,785,323 B2
(45) Date of Patent: Oct. 10, 2017

(54) TOUCH-BASED USER INTERFACE CONTROL TILES

(71) Applicant: Adobe Systems Incorporated, San Jose, CA (US)

(72) Inventors: Phil Lu, Burlingame, CA (US); Klaas Stoeckmann, Hamburg (DE); Kai Gradert, Pasadena, CA (US); Jens C. Neffe, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 304 days.

(21) Appl. No.: 14/338,619

(22) Filed: Jul. 23, 2014

(65) Prior Publication Data

US 2016/0026371 A1    Jan. 28, 2016

(51) Int. Cl.
G06F 3/048    (2013.01)
G06F 3/0484    (2013.01)
G06F 3/0482    (2013.01)
G06F 3/0488    (2013.01)

(52) U.S. Cl.
CPC ........ *G06F 3/04845* (2013.01); *G06F 3/0482* (2013.01); *G06F 3/04842* (2013.01); *G06F 3/04847* (2013.01); *G06F 3/04886* (2013.01)

(58) Field of Classification Search
CPC combination set(s) only.
See application file for complete search history.

(56) References Cited

U.S. PATENT DOCUMENTS

| 8,468,465 | B2 | 6/2013 | Warner et al. | |
| 8,601,372 | B1 * | 12/2013 | Gentile | G06F 3/0484 715/202 |
| 2002/0147788 | A1 * | 10/2002 | Nguyen | G06F 17/30902 709/217 |
| 2007/0294634 | A1 * | 12/2007 | Kokemohr | G06F 3/04845 715/781 |

(Continued)

OTHER PUBLICATIONS

Jones, "Screenshots of Snapseed for Mac (Nik Software) £13.99", Feb. 22, 2012 (downloaded from <http://cfdj1971.wordpress.com/2012/02/22/screenshots-of-snapseed-for-mac-nik-software-13-99/> on May 12, 2014).

(Continued)

*Primary Examiner* — Hien Duong
(74) *Attorney, Agent, or Firm* — Finch & Maloney PLLC

(57) ABSTRACT

A user interface includes a digital image display canvas and a plurality of control tiles arranged on a rotatable carousel. A user can browse through the control tiles using swiping gestures that rotate the carousel. Each control tile represents a parameter, an imaging effect, or some other manipulation that can be applied to the displayed image. For control tiles representing a parameter which can be selected from a range of numerical values, such as image brightness, selecting the control tile causes a universal slider to be displayed. The universal slider extends across an entire dimension of the display, thereby providing the user with a wide range of adjustment for the corresponding parameter. Selecting a different control tile associated with a different parameter causes user input received via the universal slider to be applied to the different parameter, thereby such that the same universal slider can manipulate multiple parameters.

20 Claims, 16 Drawing Sheets

(56) References Cited

U.S. PATENT DOCUMENTS

| | | | | |
|---|---|---|---|---|
| 2013/0239057 A1* | 9/2013 | Ubillos | ............... | G06F 3/04855 |
| | | | | 715/833 |
| 2014/0063047 A1* | 3/2014 | Johnson | ................ | G09G 5/028 |
| | | | | 345/594 |
| 2014/0185957 A1* | 7/2014 | Kim | .................... | H04N 5/2628 |
| | | | | 382/283 |
| 2014/0337321 A1* | 11/2014 | Coyote | ................ | G06F 3/0482 |
| | | | | 707/722 |

OTHER PUBLICATIONS

Philipp, "Review: Adobe Revel", The Epoch Times, Feb. 14-20, 2012, p. A8.

Instagram on Google Play, Instagram, May 11, 2014 (downloaded from <https://play.google.com/store/apps/details?id=com.instagram.android> on May 12, 2014).

Snapseed on Google Play, Nik Software, Inc., Oct. 29, 2013 (downloaded from <https://play.google.com/store/apps/details?id=com.niksoftware.snapseed> on May 12, 2014).

* cited by examiner

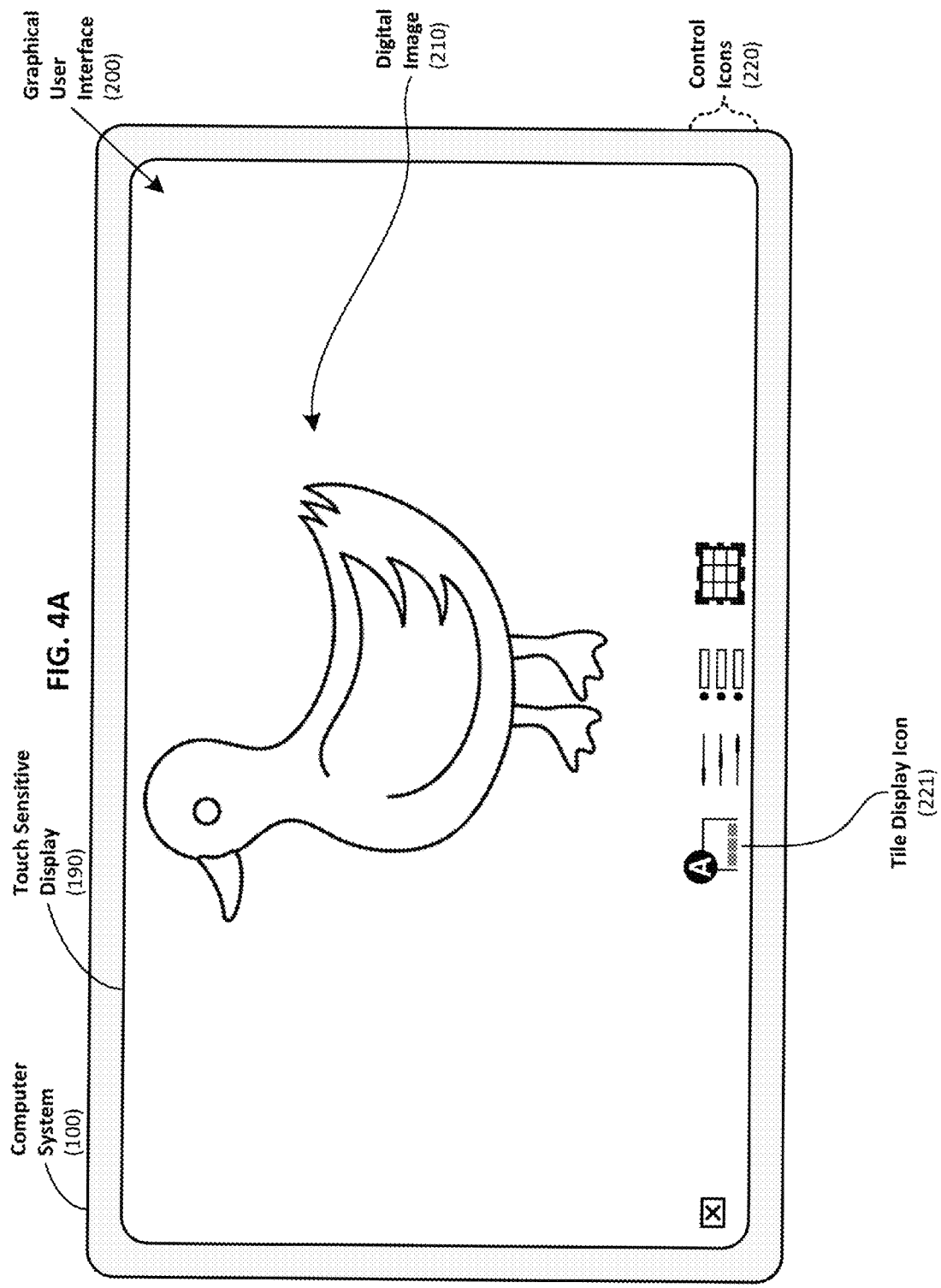

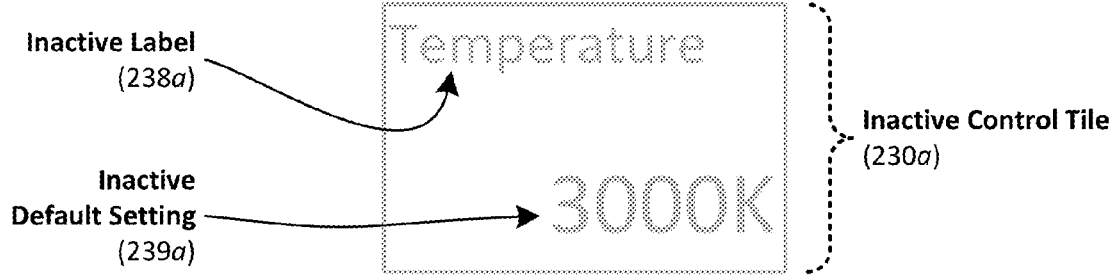
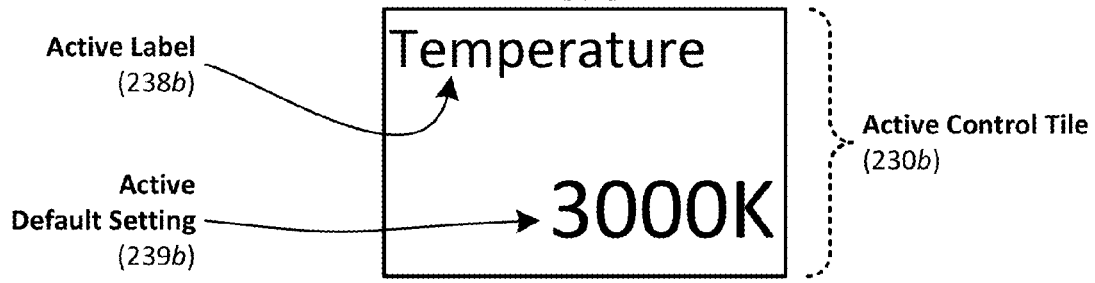
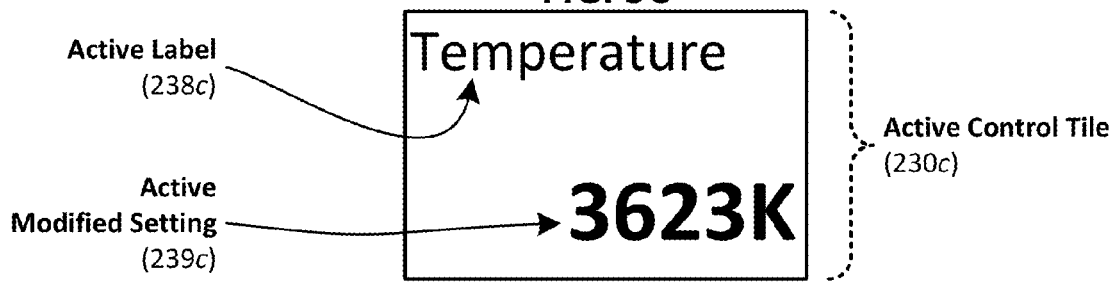
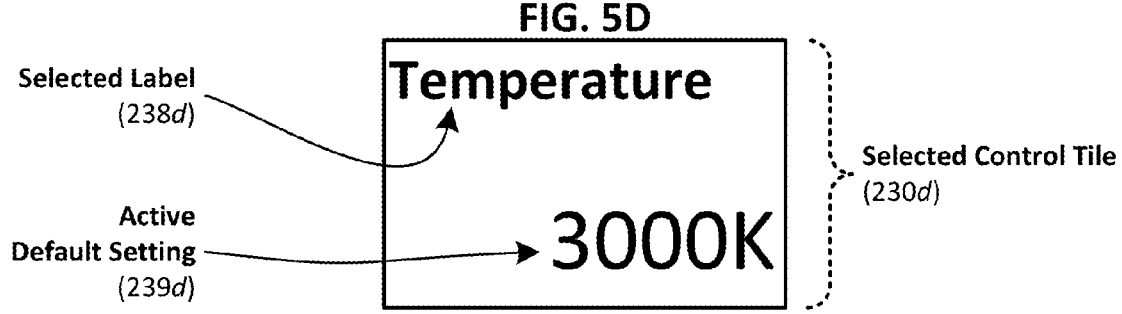

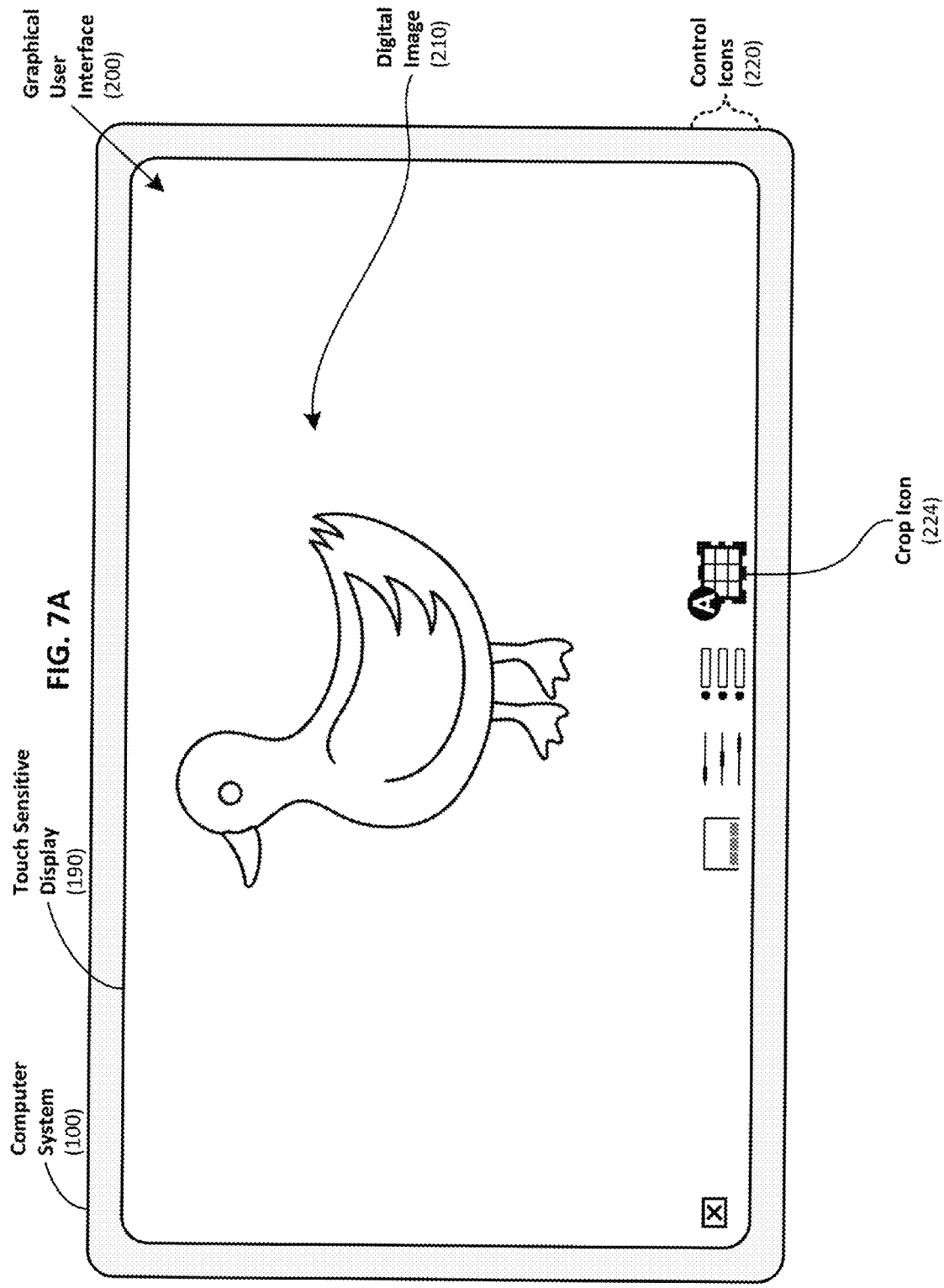

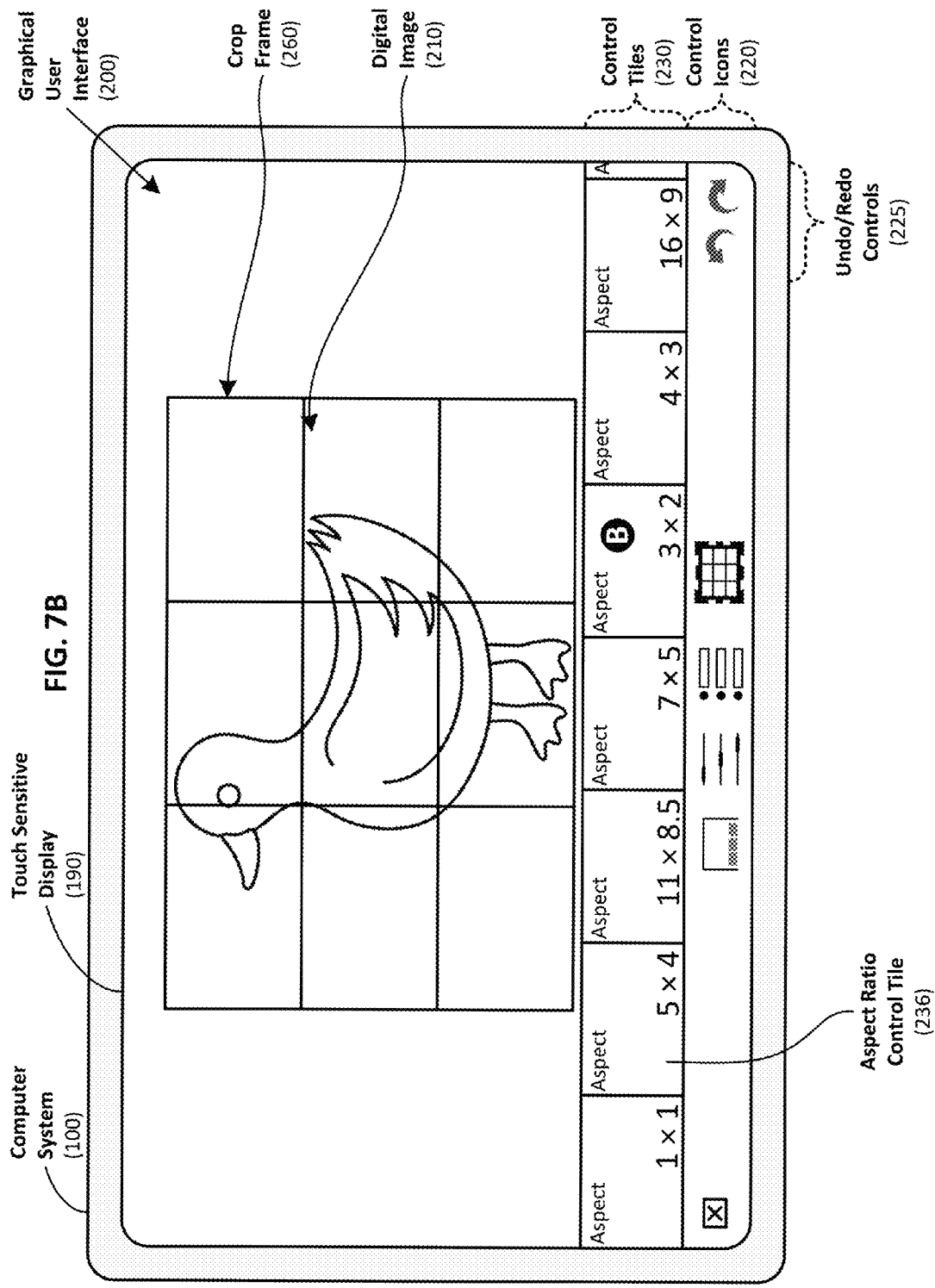

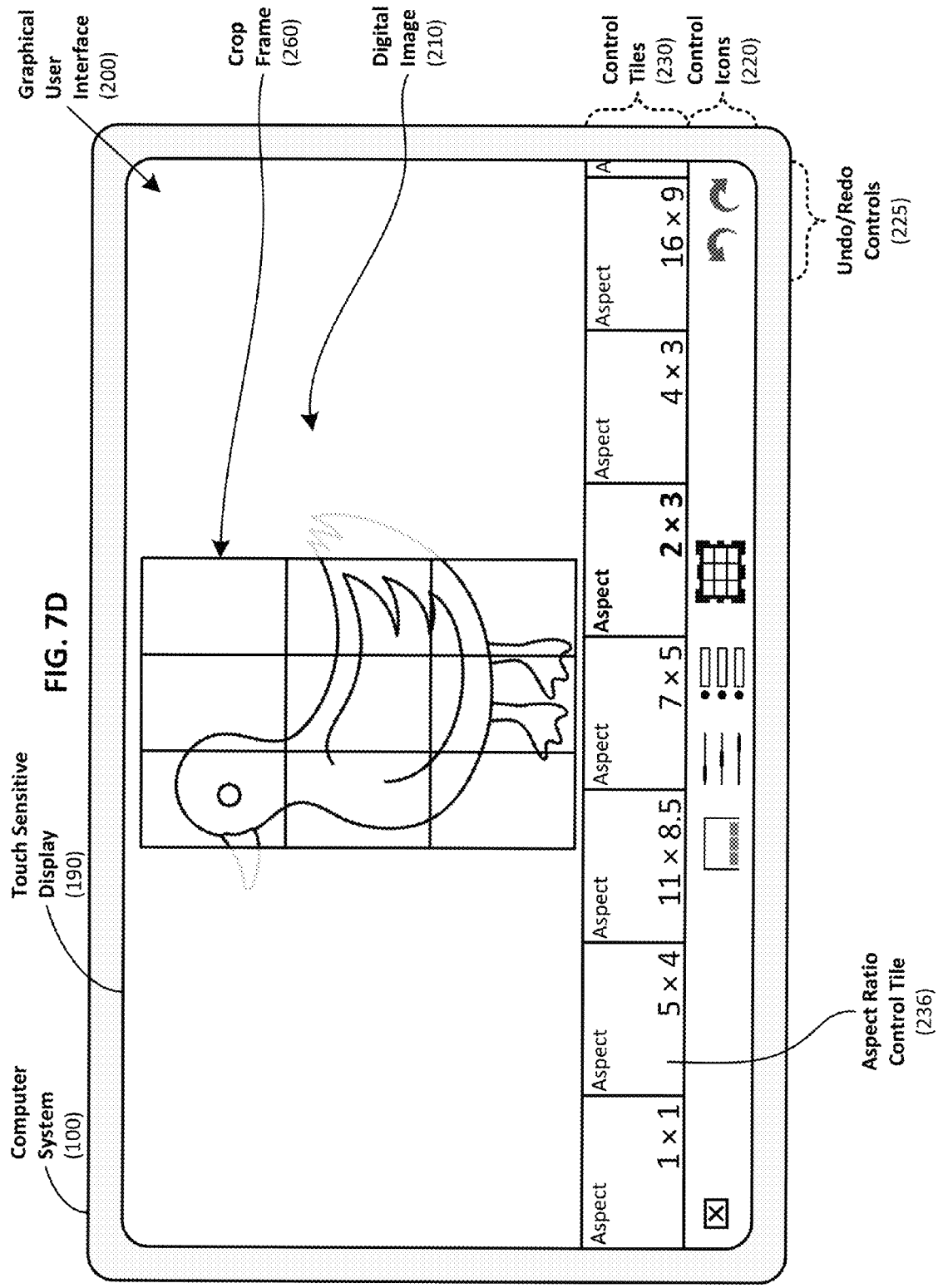

TOUCH-BASED USER INTERFACE CONTROL TILES

FIELD OF THE DISCLOSURE

This disclosure relates generally to a user interface for digital image processing, and more specifically to a graphical user interface that facilitates the manipulation of digital images using a touch-based display device such as a tablet computer or smartphone.

BACKGROUND

With the widespread availability of digital computers, scanners, and cameras, the process of creating and manipulating graphic illustrations has expanded from manual artistic or photographic techniques to also include computer-aided techniques. In particular, a wide range of image editing software applications have been developed that allow users to create and manipulate digital images. Examples of such applications include Adobe Photoshop (Adobe Systems Incorporated, San Jose, Calif.) and Corel Paint Shop Pro (Corel Corporation, Ottawa, Canada). At the same time, as modern computing devices have become increasingly compact and portable, consumers have come to expect to be able to access functionality associated with image editing software applications using a smartphone, tablet computer, or other portable device. As a result, many image editing software applications include implementations that are specifically adapted for use with mobile and/or touch-based computing environments. These mobile applications often include social networking functionality that allows users to easily share their digital images with each other. Examples of such mobile applications include Instagram (Instagram LLC, Menlo Park, Calif.) and Snapseed (Nik Software, Inc., San Diego, Calif.). One way that these applications have been adapted for use in mobile and/or touch-based computing environments is through the use of graphical user interface elements such as command menus for invoking a given functionality, virtual buttons for making a selection, display windows for providing information, and text boxes for receiving user input. One user interface element which is particularly useful in this context is a slider control. A slider control generally includes a slider element configured to move along a sliding axis. A user can select a value from a defined range of values by moving the slider element along the sliding axis. The values in the defined range are associated with different positions along the sliding axis, such as can be indicated by a tick mark or other indicia. In this way, the slider control enables a user to select different values in the defined range by moving the slider element to different positions along the sliding axis. Slider controls have been implemented to manipulate adjustable parameters such as volume levels for media playback and contrast values for digital image manipulation.

BRIEF DESCRIPTION OF THE DRAWINGS

FIG. 4A illustrates an example graphical user interface configured for use with digital image processing software executing on a device with a touch sensitive display, the interface including a tile display icon that provides access to a plurality of control tiles.

FIG. 5A illustrates an example control tile that forms part of certain of the graphical user interface embodiments disclosed herein, wherein the control tile is an inactive control tile displaying a default value.

FIG. 5B illustrates an example control tile that forms part of certain of the graphical user interface embodiments disclosed herein, wherein the control tile is an active control tile displaying a default value.

FIG. 5C illustrates an example control tile that forms part of certain of the graphical user interface embodiments disclosed herein, wherein the control tile is an active control tile displaying a modified value.

FIG. 5D illustrates an example control tile that forms part of certain of the graphical user interface embodiments disclosed herein, wherein the control tile is a selected control tile displaying a default value.

FIG. 7A illustrates an example graphical user interface configured for use with digital image processing software executing on a device with a touch sensitive display, the interface including a crop icon that provides access to a plurality of control tiles configured to manipulate the size and shape of a digital image.

FIG. 7B illustrates an example graphical user interface configured for use with digital image processing software executing on a device with a touch sensitive display, the interface including a crop frame that provides a preview of how a cropping effect will be applied to a digital image.

FIG. 7D illustrates an example graphical user interface configured for use with digital image processing software executing on a device with a touch sensitive display, the interface including a selected 2×3 aspect ratio control tile.

DETAILED DESCRIPTION

Figure 1A:
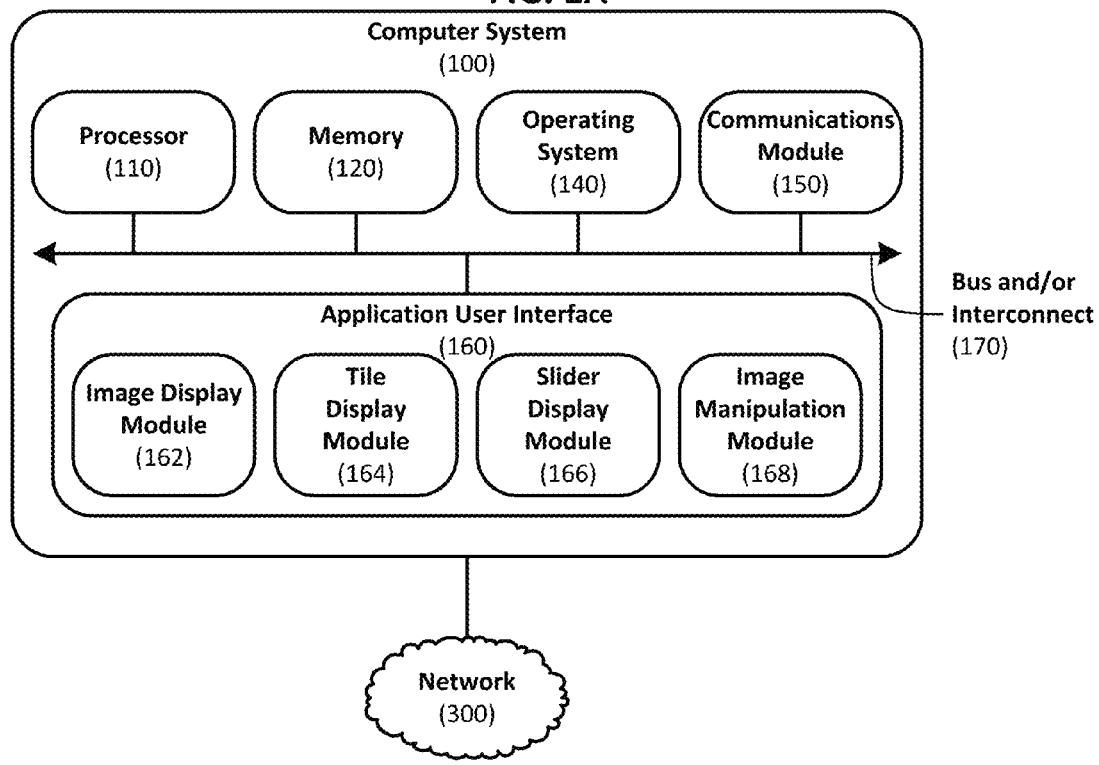
FIG. 1A is a block diagram schematically illustrating selected components of a computer system that can be used to implement certain of the disclosed embodiments.

Modern digital image processing software has become increasingly powerful and feature-laden. Advances in such software have been supported by corresponding advances in the capacity of graphics processors to manipulate and display high resolution digital imagery efficiently. Even portable computing devices such as tablet computers and smartphones now have the capacity for advanced digital image processing functionality. A modern digital image processing software tool may provide a user with access to hundreds or even thousands of different digital imaging effects which can be applied to an image. Examples of such effects range from relatively straightforward brightness, hue, or sharpening adjustments that are applied uniformly across an entire image, to advanced blurring, warping, or filtering effects which can be selectively applied to portions of an image, possibly based on one or more user-defined parameters. While such digital image manipulation tools are extremely powerful, they can also be difficult to use, especially for novice users. This difficulty is compounded when image processing software is used with a portable computing device. In particular, the smaller screen and lack of a conventional keyboard make traditional user interface components and methodologies ill-suited for working with image processing software on a portable computing device. As a result, simplified methods for manipulating digital images using a touch-based interface are desired.

Thus, and in accordance with certain of the embodiments disclosed herein, a graphical user interface is configured for use with digital image processing software executing on a device with a touch sensitive display. The graphical user interface includes a display canvas capable of displaying a digital image, as well as a plurality of control tiles arranged on a rotatable carousel. The rotatable carousel allows a user to browse through the control tiles using swiping gestures that cause the carousel to rotate. Each of the control tiles represents a parameter, an imaging effect, or some other manipulation that can be applied to the displayed digital image. For control tiles representing a parameter which can be selected from a defined range of numerical values, such as image brightness, selecting the control tile causes a universal slider to be displayed. In one embodiment, the universal slider extends across an entire dimension of the display, thereby providing the user with a wide range of adjustment for the corresponding parameter. Selecting a different control tile associated with a different parameter causes user input received via the universal slider to be applied to the different parameter, thereby allowing the same universal slider to be used to manipulate several different parameters. For control tiles representing a group of distinct imaging effects (as opposed to a numerical parameter), such as a group of filter effects, selecting the control tile causes a selection menu to be displayed listing available effects. The user can then select the desired imaging effect from the selection menu. Additional functionalities are provided in other embodiments, and numerous alternative configurations and variations will be apparent in light of this disclosure.

Certain of the embodiments disclosed herein address shortcomings associated with existing graphical user interfaces provided for digital image manipulation. In particular, such embodiments provide a graphical user interface that makes it easy to manipulate digital imagery regardless of whether the user is providing mouse-based input to a desktop computer or is providing touch-based input to a tablet computer. Such advantages can be realized without regard to the particular operating system running on a given device, the particular orientation at which a user holds the device, or whether the user is left- or right-handed. Thus such embodiments are particularly well-suited for implementation using portable computing devices such as tablet computers and smartphones. This can be accomplished, for example, by providing user interface elements that use a limited amount of display area in a particularly efficient manner.

For example, extending a universal slider across an entire dimension of the display may provide the user with a wide range of adjustment for a numerical parameter, which makes it easy for the user to precisely adjust the parameter. This is particularly helpful for smartphones and other devices which have small display screens and which are therefore not well-suited to conventional slider-based adjustments in the first place. In addition, displaying the rotatable carousel of control tiles and/or the universal slider across a horizontal dimension of the display, such as along the bottom or top of the display, provides a configuration that is not hand-biased. That is, unlike an array of sliders or a menu that is stacked vertically along the right or left side of a display, user interface elements displayed across the top or bottom of a touch sensitive display are equally accessible for both right- and left-handed users. This is particularly helpful for portable devices, where a user's handedness can significantly affect how the user interacts with user interface elements. Displaying the rotatable carousel of control tiles and/or the universal slider across a horizontal dimension of the display also provides the user with a consistent interface regardless of whether a portrait or landscape orientation is used, which is also important in the context of portable devices which may be used in various orientations.

Enabling a single universal slider to manipulate several different parameters also eliminates or reduces any need to display multiple sliders which are each dedicated to adjustment of just a single parameter. This is particularly helpful for portable devices which tend to have smaller display screens and which are therefore not well-suited for displaying multiple sliders simultaneously. In particular, existing solutions which display multiple sliders simultaneously must display such sliders either in a horizontal sequence (in which case the sliders have a limited range of adjustment) or in a vertical stack (which will likely be left- or right-hand biased depending on the side of the display where the stack is located). In addition, vertically-stacked sliders will consume a large portion, if not all, of the limited display area of a portable device, thus making it difficult or impossible to simultaneously adjust the multiple sliders and view the resulting modified image.

System Architecture

Figure 1B:
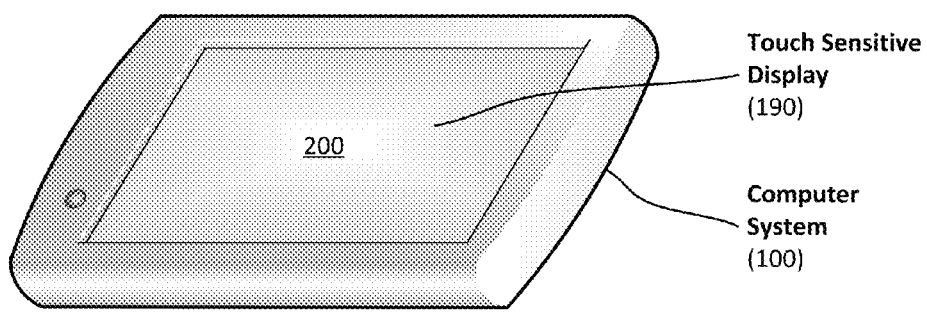
FIG. 1B is a perspective view of an example embodiment of the computer system of FIG. 1A, wherein the computer system is implemented as a tablet computer having a touch sensitive display.

FIG. 1A is a block diagram schematically illustrating selected components of a computer system 100 that can be used to implement certain of the disclosed embodiments. Computer system 100 may comprise, for example, one or more devices selected from a desktop computer, a laptop computer, a workstation, a tablet computer, a smartphone, a handheld computer, a set-top box, or any other suitable computing device. For example, FIG. 1B illustrates an example embodiment wherein computer system 100 is implemented as a tablet computer having a touch sensitive display 190 capable of displaying a graphical user interface 200. In other embodiments a combination of different devices may be used as computer system 100. As illustrated in FIG. 1A, computer system 100 includes, among other things, a processor 110, a memory 120, an operating system 140, a communications module 150, and an application user interface 160. As can be further seen, a bus and/or interconnect 170 is provided to allow for intra-device communications using, for example, communications module 150.

Computer system 100 is optionally coupled to a network 300 to allow for communications with other remotely-located computing devices and/or resources, such as a server, a media repository, or a content management system. Network 300 may be a local area network (such as a home-based or office network), a wide area network (such as the Internet), or combination of such networks, whether public, private or both. In some cases access to computing resources on a given network may require credentials such as usernames, passwords, and/or any other suitable security mechanism. Other embodiments of computer system 100 may not be coupled to any network and may instead operate as a stand-alone computing system. In certain embodiments computer system 100 includes, or is coupled to, certain peripheral hardware components, such as a display, a textual input device, a pointer-based input device, a speaker, and/or a microphone. Thus, in alternative embodiments components such as these may be integrated into the computer system 100 itself. Other componentry and functionality not reflected in the schematic block diagram of FIG. 1A will be apparent in light of this disclosure, and it will be appreciated that the claimed invention is not intended to be limited to any particular hardware components or configuration of such components.

Still referring to the example embodiment illustrated in FIG. 1A, processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disk drive, a universal serial bus (USB) drive, flash memory, and/or random access memory. Operating system 140 may comprise any suitable operating system, such as Google Android (Google Inc., Mountain View, Calif.), Microsoft Windows (Microsoft Corporation, Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may be implemented using any suitable existing or subsequently-developed platform. Communications module 150 can be any appropriate network chip or chipset which allows for wired and/or wireless connection to network 300, peripheral hardware components, or other remotely-located computing devices and/or resources, thereby enabling computer system 100 to communicate with other such systems, servers, peripheral hardware, and/or resources.

Application user interface 160 is configured to provide information to, and to receive information and commands from, a user. It can be implemented or used in conjunction with a variety of suitable input/output components that can be coupled to or that otherwise form part of computer system 100. For example, in one embodiment application user interface 160 is configured to render user interface 200 on touch sensitive display 190 of tablet computer system 100, as illustrated in FIG. 1B. The functionality of application user interface 160 can be implemented using one or more modules such an image display module 162, a tile display module 164, a slider display module 166, and an image manipulation module 168. Other modules and/or sub-modules may additionally or alternatively be included in other embodiments. For example, in certain embodiments the functionality provided by the various modules described herein can be written in an object oriented programming language such that the selection and highlighting of individual control tiles is implemented in a base class of control tiles. In such embodiments additional functionality associated with the control tiles, such as manipulating a selection menu or rotating a tile carousel, can be implemented in one or more subclasses of the base class of control tiles. Likewise, the user interface functionalities disclosed herein may be implemented in one or more dedicated modules with which application user interface 160 interacts.

In certain embodiments application user interface 160 is installed local to computer system 100, as illustrated in the example embodiment of FIG. 1A. However, in alternative embodiments computer system 100 can be implemented in a client-server arrangement wherein at least some portion of the application user interface 160 is provided to a client computer using an applet, such as a JavaScript applet, or other downloadable module. Such a remotely accessible module can be provided in real-time in response to a request from the client computer system for access to a given server having resources that are of interest to a user of the client computer system. For example a user of a tablet computer may invoke application user interface 160 upon accessing a client-based repository of digital images and/or other content that the user wishes to manipulate. In such embodiments the server can be local to network 300 or remotely coupled to network 300 by one or more other networks and/or communication channels. In any such standalone or networked computing scenarios, application user interface 160 may be implemented with any suitable interface technologies and/or hardware componentry that enables a user to interface with computer system 100.

In certain embodiments image display module 162 can be configured to render a digital image on a display, such as on touch sensitive display 190. In particular, image display module 162 can be configured to render a digital image based on image data which may be saved in any of a wide variety of standardized or proprietary formats, including compressed or uncompressed formats, in addition to rasterized or vector formats. For instance, in certain embodiments image display module 162 can be used to render images saved using the JPEG, TIFF, GIF, BMP, PNG, PSD, or PSB formats. However, this list is not intended to be exhaustive, and therefore the systems and methods disclosed herein can also be used with other existing or subsequently developed file formats in other embodiments. To this end, certain embodiments of image display module 162 are also capable of converting digital image data from one format to another. Furthermore, in addition to rendering the digital image itself, image display module 162 may also be configured to display other information associated with a digital image, including metadata that characterizes parameters such as imaging effects applied to a digital image, exposure information, timestamp information, digital rights management restrictions, and the like. For example, in one embodiment image display module 162 is configured to display selected metadata in a partially transparent window overlaying a portion of a digital image. Certain embodiments may also be configured to provide functionality that allows a user to manipulate how a digital image is rendered, such as image zooming and panning functionality. This functionality may be specifically configured for implementation using a touch sensitive display, such as by responding to a pinching gesture to adjust a zoom factor. For instance, in one embodiment image display module 162 is configured to retrieve and browse multiple images stored in an image repository in response to a user's left- or right-swipe gestures.

Still referring to FIG. 1A, in certain embodiments tile display module 164 can be configured to display one or more control tiles associated with a digital image. As will be described in greater detail, control tiles provide a user interface element which can be used to manipulate the appearance of a digital image. For example, control tiles can be used to adjust the hue of a digital image, to apply a filtering effect to a digital image, or to undo a previously applied digital imaging effect. Control tiles can also be used to provide information regarding a displayed digital image, such as the magnitude of a brightness or luminosity adjustment. In certain embodiments tile display module 164 is further configured to display a plurality of control tiles on a carousel which can be rotated in response to a user's swiping gestures. This provides an easy way for a user to access a large quantity of control tiles without consuming significant display area, which is particularly advantageous for portable device implementations. Additional information regarding control tiles and their functionality will be provided in turn.

In certain embodiments slider display module 166 can be configured to display a universal slider associated with a digital image. For example, in one embodiment the universal slider is displayed across an entire dimension of the display, and includes a line of tick marks that represent a range of numerical values which can be taken by a given parameter. An assigned value is indicated by a current value indicator which can be moved across the range of tick marks, for example in response to a user's swiping gesture. The universal slider can be configured to apply to a selected one of a variety of different imaging parameters, such as a parameter indicated by a user's selection of a particular control tile. For example, in one embodiment selecting a brightness control tile causes a universal slider to be displayed, wherein the universal slider is configured to adjust an image brightness. Selecting a hue control tile causes input received via the universal slider to instead by applied to a hue modification. Thus a single universal slider can be used to manipulate a variety of different parameters, thereby providing a wide range of image modification functionality without consuming significant display area, which is particularly advantageous for portable device implementations. In certain embodiments the universal slider can be made transparent or partially transparent so as to allow the image to be visible through the slider, thus further economizing use of a limited display area.

Referring still to FIG. 1A, in certain embodiments image manipulation module 168 can be configured to apply an imaging effect to a digital image. A digital imaging effect can be understood as a processing technique that adjusts the graphical attributes of the individual pixels that compose a digital image in a way that produces a particular visual effect. Examples of digital imaging effects include hue adjustments, contrast adjustments, sharpness adjustments, brightness adjustments, gamma correction, blurring effects, warping effects, diffusion filters, and edge enhancements. Certain effects can be applied uniformly across an entire image, while other effects can be applied only to certain regions of an image, such as to the perimeter of an image or to a user-specified area. In addition, certain effects can be applied based on parameters which are predefined, fixed, or otherwise provisioned by default. Other effects can be applied based on user-configurable parameters, such as user-provided input received via a universal slider or selection menu. A digital imaging effect can be applied to a digital image in an edit operation that is performed by a digital imaging processing application. Examples of software tools which can be used to provide the functionality associated with image manipulation module 168 include, but are not limited to, Adobe Photoshop, Adobe Edge Reflow (Adobe Systems Incorporated, San Jose, Calif.), GNU Image Manipulation Program (GIMP), Corel Paint Shop Pro and Microsoft Paint (Microsoft Corporation, Redmond, Wash.). It will be appreciated that a variety of different software tools can be used to generate a corresponding variety of different digital imaging effects.

The various embodiments disclosed herein can be implemented in various forms of hardware, software, firmware, and/or special purpose processors. For example in one embodiment a non-transitory computer readable medium has instructions encoded thereon that, when executed by one or more processors, cause one or more of the touch-based user interface control tile methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment, the system can be hosted on a given website and implemented using JavaScript or another suitable browser-based technology, for example.

The various embodiments disclosed herein can optionally be incorporated into software applications other than those specifically configured for the manipulation of digital images. For example, a word processing application may be capable of importing and embedding digital images into a text-based document. In such case, the word processing application can be configured to implement certain of the functionalities disclosed herein to facilitate manipulation of the imported digital images. The computer software applications disclosed herein may therefore include a number of different modules, sub-modules, or other components of distinct functionality that can provide information to, or receive information from, still other components and/or services. The modules can be used, for example to communicate with input and/or output devices such as a pointer device, a display screen, a touch sensitive surface, a printer, and/or any other suitable input/output device. Other components and functionality not reflected in the illustrations will be apparent in light of this disclosure, and it will be appreciated that the claimed invention is not intended to be limited to any particular hardware or software configuration. Thus in other embodiments the configuration illustrated in FIG. 1A may comprise additional, fewer, or alternative components.

The aforementioned non-transitory computer readable medium may be any suitable medium for storing digital information, such as hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present invention is not intended to be limited to any particular system architecture.

User Interface and Methodology

Figure 2:
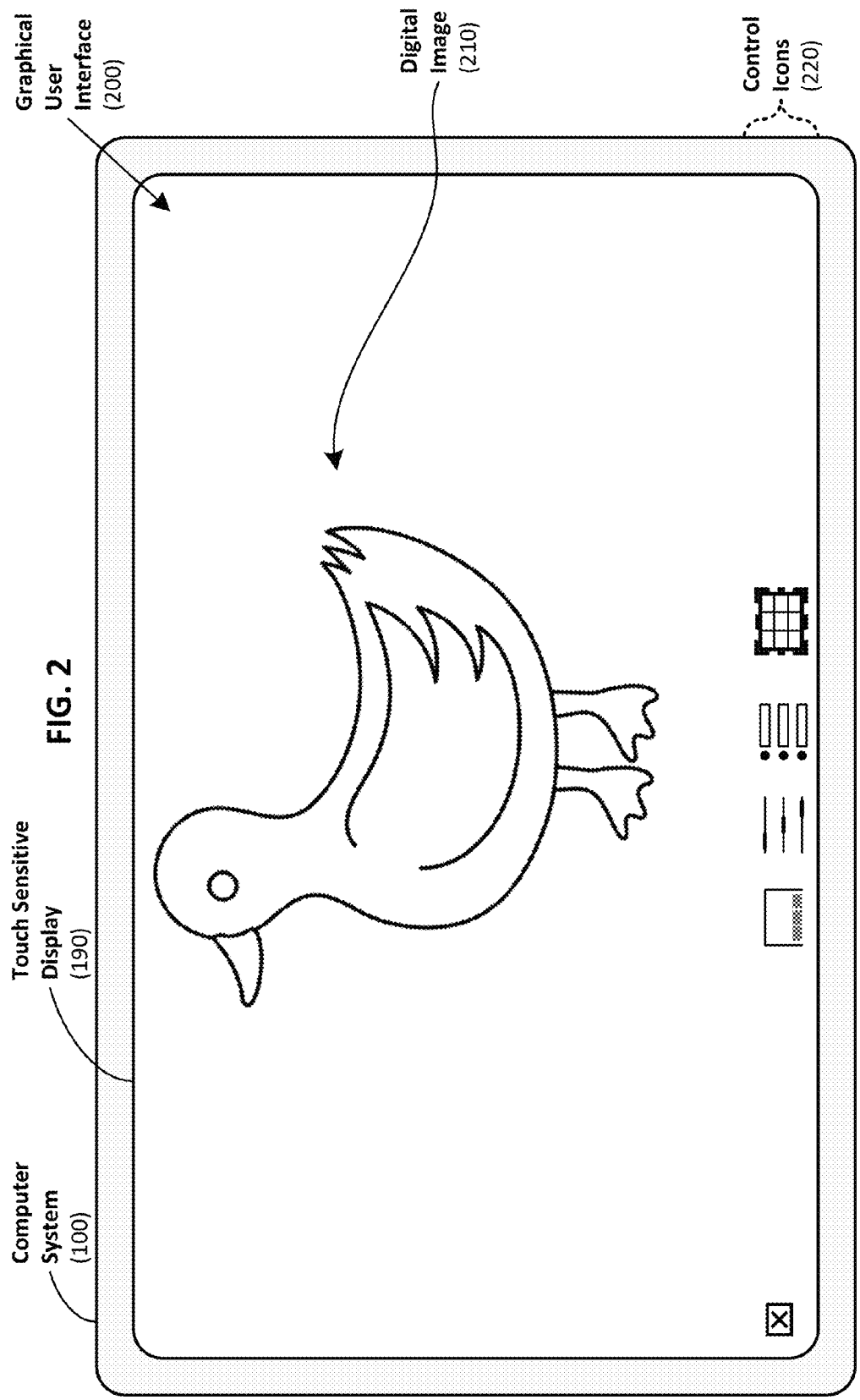
FIG. 2 illustrates an example graphical user interface configured for use with digital image processing software executing on a computer system with a touch sensitive display, wherein a digital image is displayed in the graphical user interface.
Figure 3:
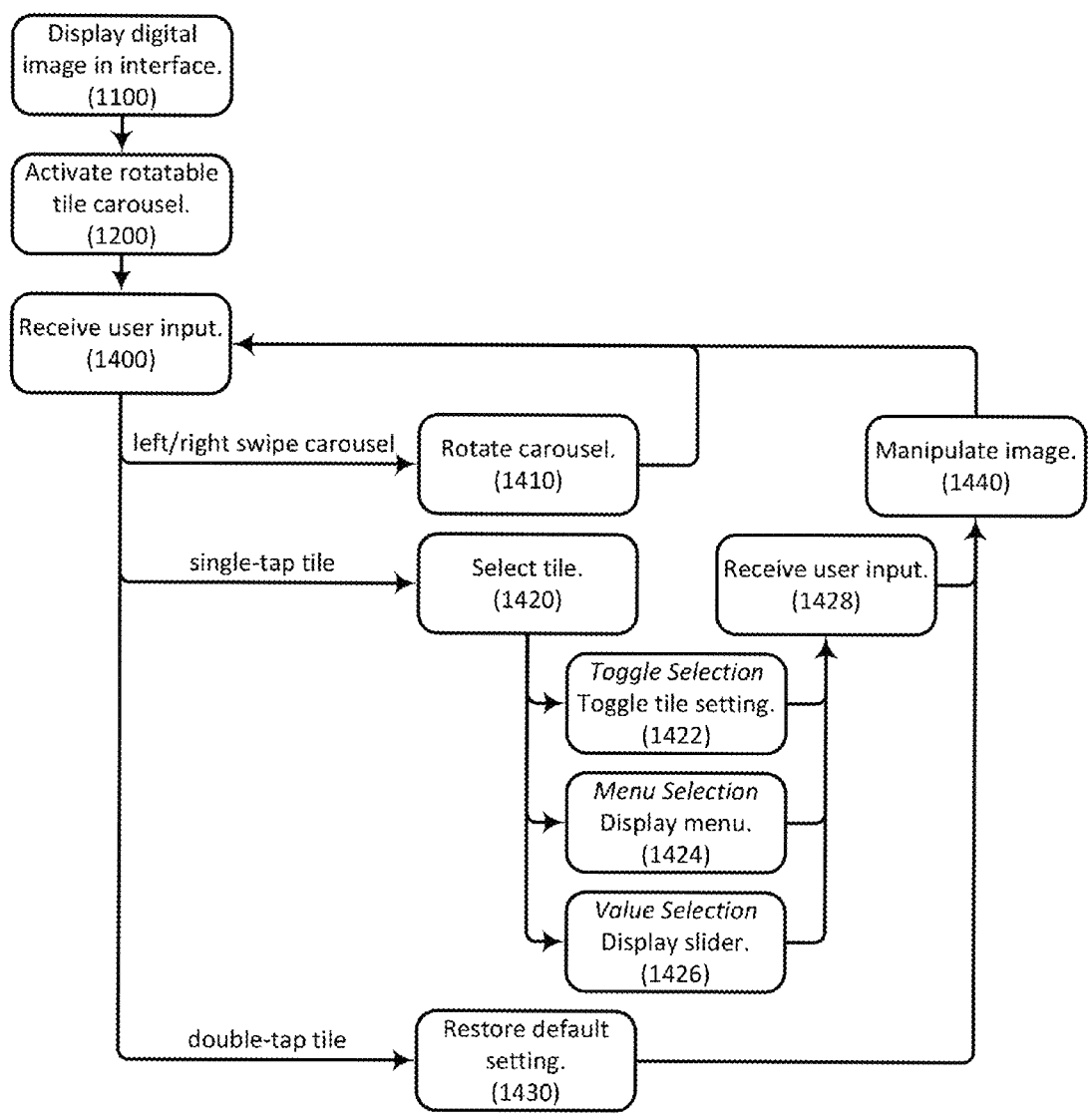
FIG. 3 is a workflow diagram illustrating methods for using certain of the disclosed embodiments of a graphical user interface to manipulate the appearance of a digital image.

FIG. 2 illustrates an example graphical user interface 200 configured for use with digital image processing software executing on a computer system 100 with a touch sensitive display 190, wherein a digital image 210 is displayed in the graphical user interface 200. While digital image 210 illustrated in FIG. 2 comprises a line art drawing for purposes of clarity, it will be appreciated that, in general, digital image 210 may comprise any digital image rendered at a suitable resolution based on the display used to the render the image. One or more control icons 220 are also displayed in graphical user interface 200. FIG. 3 is a workflow diagram illustrating a method 1000 for using graphical user interface 200 to manipulate the appearance of digital image 210. Method 1000 comprises a number of phases and sub-processes, the sequence of which may vary from one embodiment to another. However, when considered in the aggregate, these phases and sub-processes form an image manipulation method 1000 which is responsive to user commands in accordance with certain of the embodiments disclosed herein. Method 1000 can be implemented, for example, using the system architecture illustrated in FIG. 1A and described herein. However, other system architectures can be used in other embodiments, as will be apparent in light of this disclosure. Thus the correlation of the various functionalities shown in FIG. 3 to the specific components illustrated in FIG. 1A, as described herein, is not intended to imply any structural and/or use limitations. Thus other embodiments may have fewer or more modules and/or sub-modules depending on the granularity of a particular implementation. Numerous variations and alternative configurations will be apparent in light of this disclosure.

Figure 4B:
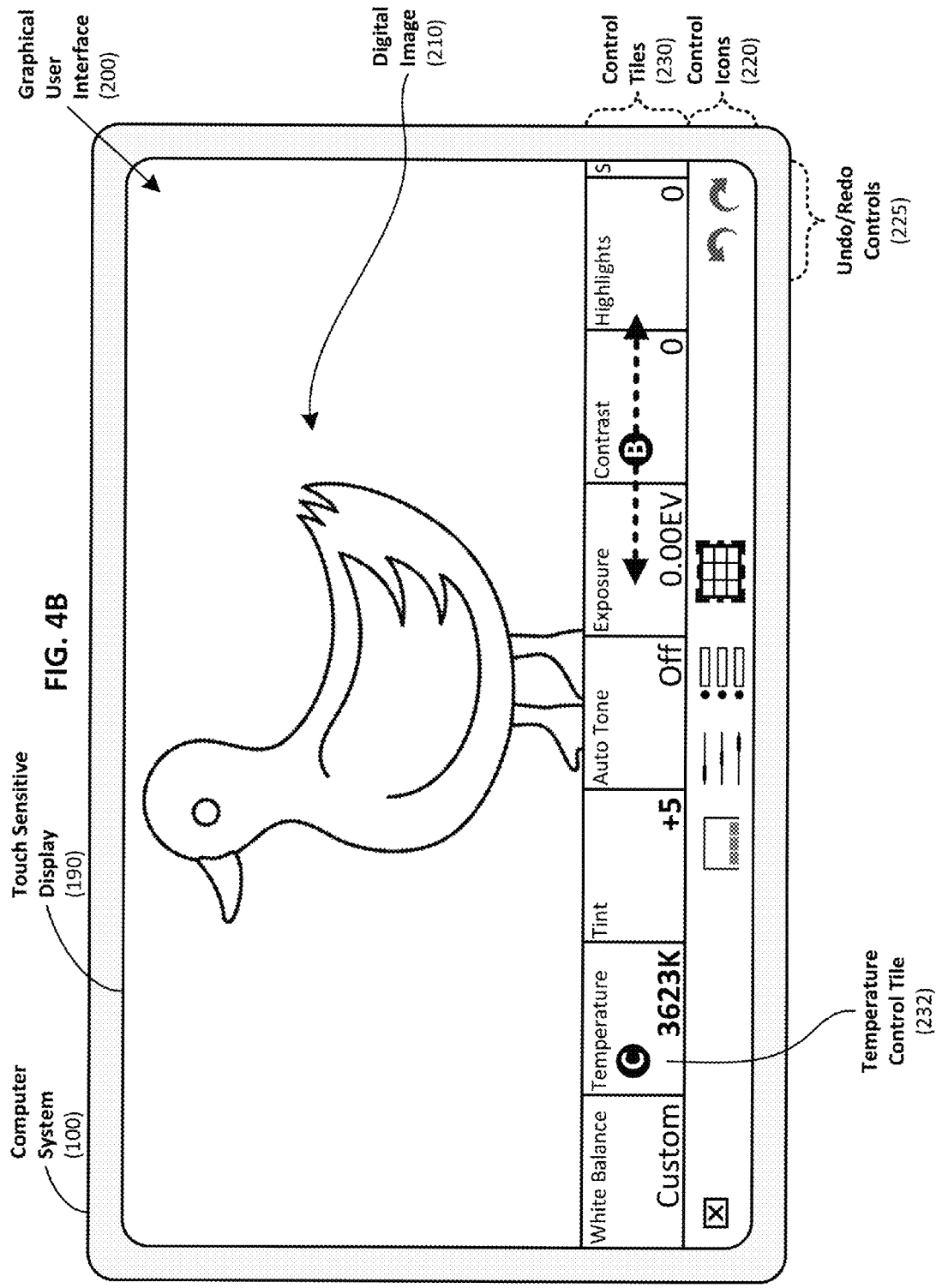
FIG. 4B illustrates an example graphical user interface configured for use with digital image processing software executing on a device with a touch sensitive display, the interface including a plurality of control tiles that provide access to image manipulation functionality.

User interface method 1000 commences with using image display module 162 to display digital image 210 in graphical user interface 200. See reference numeral 1100 in FIG. 3. A rotatable tile carousel can be displayed by performing a single-tap gesture on, or otherwise selecting, a tile display icon 221. See reference numeral 1200 in FIG. 3, as well as single-tap gesture A in FIG. 4A. The result of performing such a gesture is illustrated in FIG. 4B, in which a plurality of equally distributed, rectangular control tiles 230 are displayed in a rotatable tile carousel that forms part of graphical user interface 200. In an alternative embodiment the rotatable tile carousel and control tiles 230 are configured to be displayed automatically upon display of digital image 210 in graphical user interface 200. In either case, control tiles 230 can be horizontally arranged adjacent a top or bottom edge of touch sensitive display 190, thereby allowing graphical user interface 200 to be unbiased with respect to a user's left- or right-handed preference. In addition, while control tiles 230 are illustrated in FIG. 4B as being opaque (they overlap part of the duck's feet), in alternative embodiments control tiles 230 can be at least partially transparent, thereby reducing the extent to which their display interferes with the display of digital image 210. Tile display module 164 can be used to control the appearance and display of control tiles 230.

FIGS. 5A through 5D illustrate example control tiles which may be displayed in conjunction with certain of the embodiments disclosed herein. These control tiles include, in a relatively smaller font, a label, and in a relatively larger font, a setting associated with the label. For instance, in FIGS. 5A through 5D, the label is "Temperature", and the setting associated with this label is "3000K" (in FIG. 5B, for example) or "3623K" (in FIG. 5C, for example). Several other labels and settings are provided in the various example control tiles illustrated in FIGS. 4B, 4C, 6A, 6B, 6C, 7B, 7C, and 7D. In general, control tiles can be used to provide a wide range of image manipulation functionality, and thus it will be appreciated that a correspondingly wide range of labels and settings may be displayed on such tiles. FIGS. 5A through 5D also provide various examples of how different typefaces, line thicknesses, and/or colors can be used to distinguish active/inactive control tiles, selected/deselected control tiles, and default/modified setting parameters. Thus, regardless of the particular display indicia which are used, certain embodiments provide control tiles having a visual appearance that provides information with respect to whether the tile is active or inactive, selected or deselected, or displaying a default or modified setting parameter.

For example, FIG. 5A illustrates an inactive control tile 230a displaying a default setting. An inactive label 238a and an inactive default setting 239a are greyed out with respect to other implementations, thereby indicating that control tile 230a is inactive. In general, a control tile may be rendered inactive when it cannot be used in a given context, for example because its functionality is inapplicable to the digital image being viewed, or because the user lacks permission to modify the digital image being viewed. In contrast, FIG. 5B illustrates an active control tile 230b displaying a default setting. An active label 238b and an active default setting 239b have a color that is darker with respect to inactive implementations, thereby indicating that active default setting 239b can be modified. Active default setting 239b ("3000K") corresponds to a default or initially-set value.

On the other hand, if the setting shown on a control tile does not correspond to a default or initially-set value, this can be indicated by displaying the setting with a different typeface, such as a bold typeface. For example, FIG. 5C illustrates an active control tile 230c displaying a modified setting. An active label 238c and an active modified setting 239c have a color that is darker with respect to inactive implementations, thereby indicating that active modified setting 239c can be modified. Active modified setting 239c is also displayed with a different typeface, such as a bold typeface, thereby indicating that the setting ("3623K") does not correspond to a default or initially-set value. In general, if a user wishes to modify a given setting, the user will select the control tile associated with that setting. In the context of a graphical user interface that is implemented using a touch sensitive display, such a selection can be accomplished, for example, by tapping on the control tile. The selection can be indicated by displaying the label with a different typeface, such as a bold typeface. For example, FIG. 5D illustrates a selected control tile 230d displaying a default setting. A selected label 238d and an active default setting 239d have a color that is darker with respect to inactive implementations, thereby indicating that active default setting 239d can be modified. Selected label 238d is also displayed with a different typeface, such as a bold typeface, thereby indicating that control tile 230d has been selected.

Once the rotatable carousel has been activated and control tiles 230 are displayed, various types of user input may be received. See reference numeral 1400 in FIG. 3. For example, in some applications, the number of available control tiles may exceed that which can conveniently be displayed at one time in graphical user interface 200. In this case, the user may perform a left- or right-swipe gesture to rotate the carousel and see additional tiles. See reference numeral 1410 in FIG. 3, as well as left- or right-swipe gesture B in FIG. 4B. In general, swipe gesture B can be made at any convenient point along the rotatable carousel.

Figure 4C:
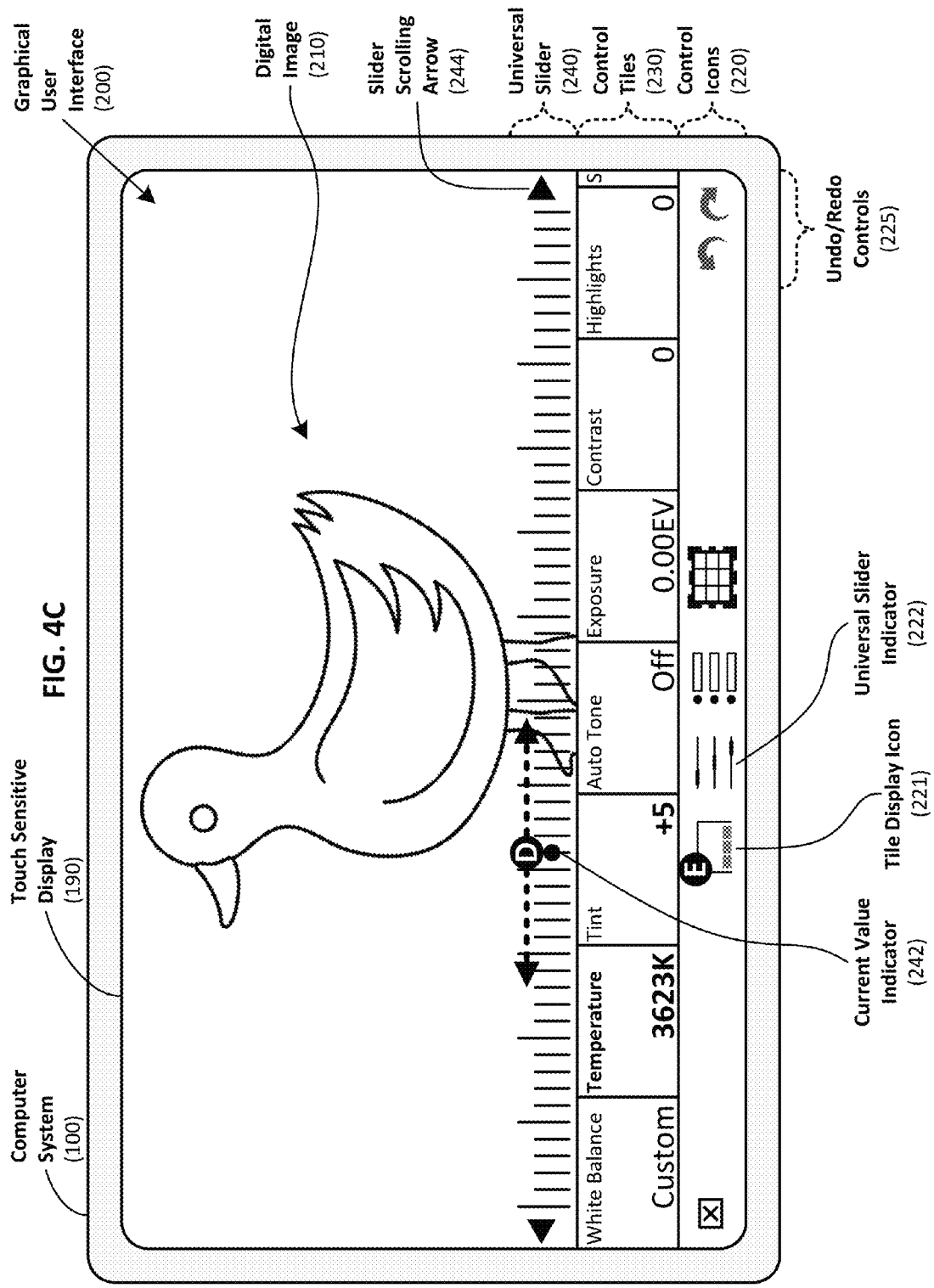
FIG. 4C illustrates an example graphical user interface configured for use with digital image processing software executing on a device with a touch sensitive display, the interface including a universal slider that enables an image parameter to be adjusted across a defined range of values.

Another type of user input that may be received via the rotatable carousel is a tile selection gesture. More specifically, in certain embodiments the user may perform a single-tap gesture to indicate selection of a control tile. See reference numeral 1420 in FIG. 3, as well as single-tap gesture C in FIG. 4B. For example, single-tap gesture C in FIG. 4B causes a temperature control tile 232 to become selected; such selection is indicated in FIG. 4C by the tile label ("Temperature") being displayed in a bold typeface. In addition to causing the tile label to have a distinctive appearance, selecting a control tile may have other effects depending on the particular type of tile selected. A swiping gesture can be distinguished from a tapping gesture based on a threshold contact time, such that if contact is maintained with the touch sensitive display for a time greater than the threshold, the gesture is presumed to be a swiping gesture as distinguished from a tapping gesture.

Temperature control tile 232 corresponds to a numerical temperature setting that can be adjusted across a range of values. In this case, where a control tile associated with a numerical value is selected, a universal slider 240 can be displayed. See reference numeral 1426 in FIG. 3. As illustrated in the example embodiment of FIG. 4C, universal slider 240 can be displayed across an entire dimension of touch sensitive display 190, and can include a line of tick marks that represent a range of numerical values which can be taken by the parameter associated with the selected control tile. FIG. 4C also illustrates that universal slider 240 can be transparent or partially transparent, thereby reducing the extent to which its display interferes with display of digital image 210. Universal slider 240 optionally includes a current value indicator 242 which can be used to indicate a current value of the numerical parameter corresponding to the selected control tile. Quickly glancing at the relative location of current value indicator 242 allows a user to quickly ascertain how a currently selected value relates to the range of available numerical values. In certain embodiments displaying universal slider 240 also causes a universal slider indicator 222 to become highlighted, emphasized, or otherwise indicated as having been activated. Slider display module 166 can be used to control the appearance, display and functionality of universal slider 240.

Universal slider 240 provides an easy way for a user to adjust a numerical parameter associated with a selected control tile. In one application, the user can perform a single-tap gesture at a selected location on universal slider 240 to set the numerical parameter corresponding to a selected control tile. For example, performing a single-tap gesture at the midpoint of universal slider 240 would cause the corresponding numerical parameter to be set at the midpoint of the range of available values. Alternatively, the user can perform a left- or right-swipe gesture on current value indicator 242 to virtually drag indicator 242 to a different location on universal slider 240. See left- or right-swipe gesture D in FIG. 4C. In certain embodiments universal slider 240 can be configured to represent only a portion of a range of available numerical values, thereby facilitating fine adjustments. For example, universal slider 240 can be configured to allow the user can zoom in or zoom out on the slider, thereby increasing or decreasing the scale at which adjustments are made, respectively. In such embodiments universal slider 240 can be configured to rotate in similar manner as the rotatable tile carousel. Additionally or alternatively, scrolling arrows 244 can be used to rotate universal slider 240. Regardless of how the user interacts with universal slider 240, it will be appreciated that universal slider provides a way to receive user input regarding a modification that is to be applied to digital image 210. See reference numeral 1428 in FIG. 3. Once this input is received, image manipulation module 168 can be used to manipulate digital image 210 accordingly. See reference numeral 1440 in FIG. 3.

Because universal slider 240 and control tiles 230 may be displayed concurrently, it is easy for the user to adjust a different imaging parameter by selecting a different control tile. For example, FIG. 4C illustrates an embodiment wherein the user has selected temperature control tile 232 and has used universal slider 240 to adjust the temperature parameter. If the user wishes to adjust a different parameter, such as tint, the user simply selects the desired control tile. Such selection causes input received via universal slider 240 to be applied to the newly selected parameter. This advantageously allows multiple parameters to be adjusted with a single slider element, thereby reducing the portion of the display dedicated to control elements and increasing the portion of the display available for display of digital image 210. Certain embodiments include undo/redo controls 225 that allow the user to undo and/or redo imaging modifications made using universal slider 240.

A variety of different gestures can be used to manipulate the appearance of digital image 210 using universal slider 240. For instance, it will be appreciated that certain imaging adjustments may be limited in some respect, and it may be desired to visually see when such limits have been reached. To provide a specific example, increasing the contrast of a digital image beyond a certain point will cause the areas of the image with maximum brightness to have the same appearance. This effect is referred to as "clipping". Clipping may occur when limits are reached in connection with other imaging adjustments as well. Thus, it is often desired to provide a user with some indication of both when and where clipping occurs during an adjustment that is made using universal slider 240. In an alternative embodiment contacting touch sensitive display 190 with a second finger while manipulating universal slider 240 with a first finger causes clipping detection feedback to be provided. Clipping detection feedback may comprise indicating a clipped region of digital image 210 with a different color or other visual indicia. For example, in the context of a contrast adjustment, the clipping detection feedback may comprise displaying only those colors which are clipped as a result of the contrast adjustment. In such embodiments, graphical user interface 200 is optionally configured to display white in regions where all color channels are clipped. Implementations where clipping detection feedback is provided advantageously give the user a better understanding of how a particular image manipulation may affect the appearance of digital image 210.

Figure 4D:
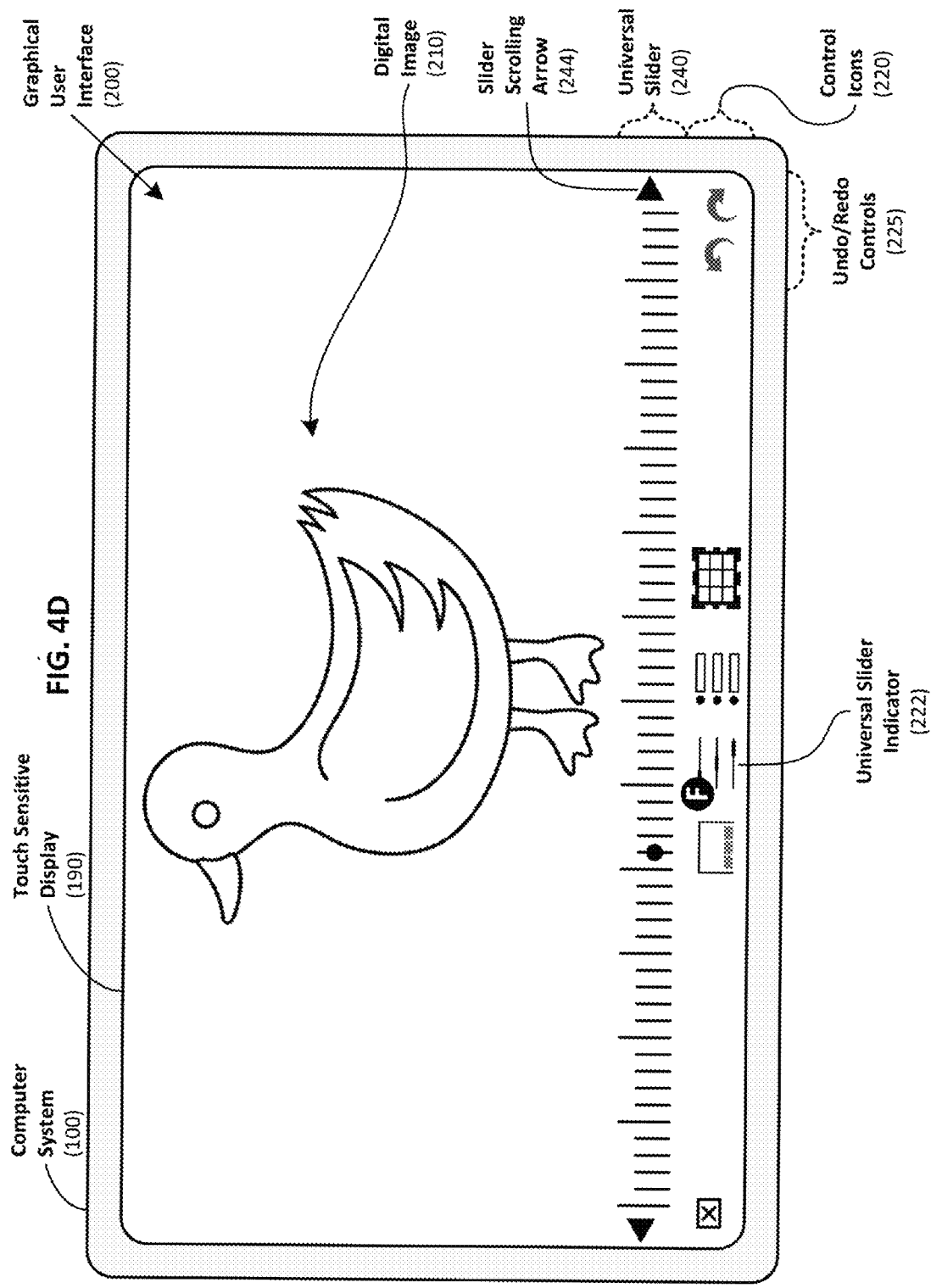
FIG. 4D illustrates an example graphical user interface configured for use with digital image processing software executing on a device with a touch sensitive display, the interface including a universal slider indicator that toggles the display of a universal slider, wherein the universal slider is displayed.
Figure 4E:
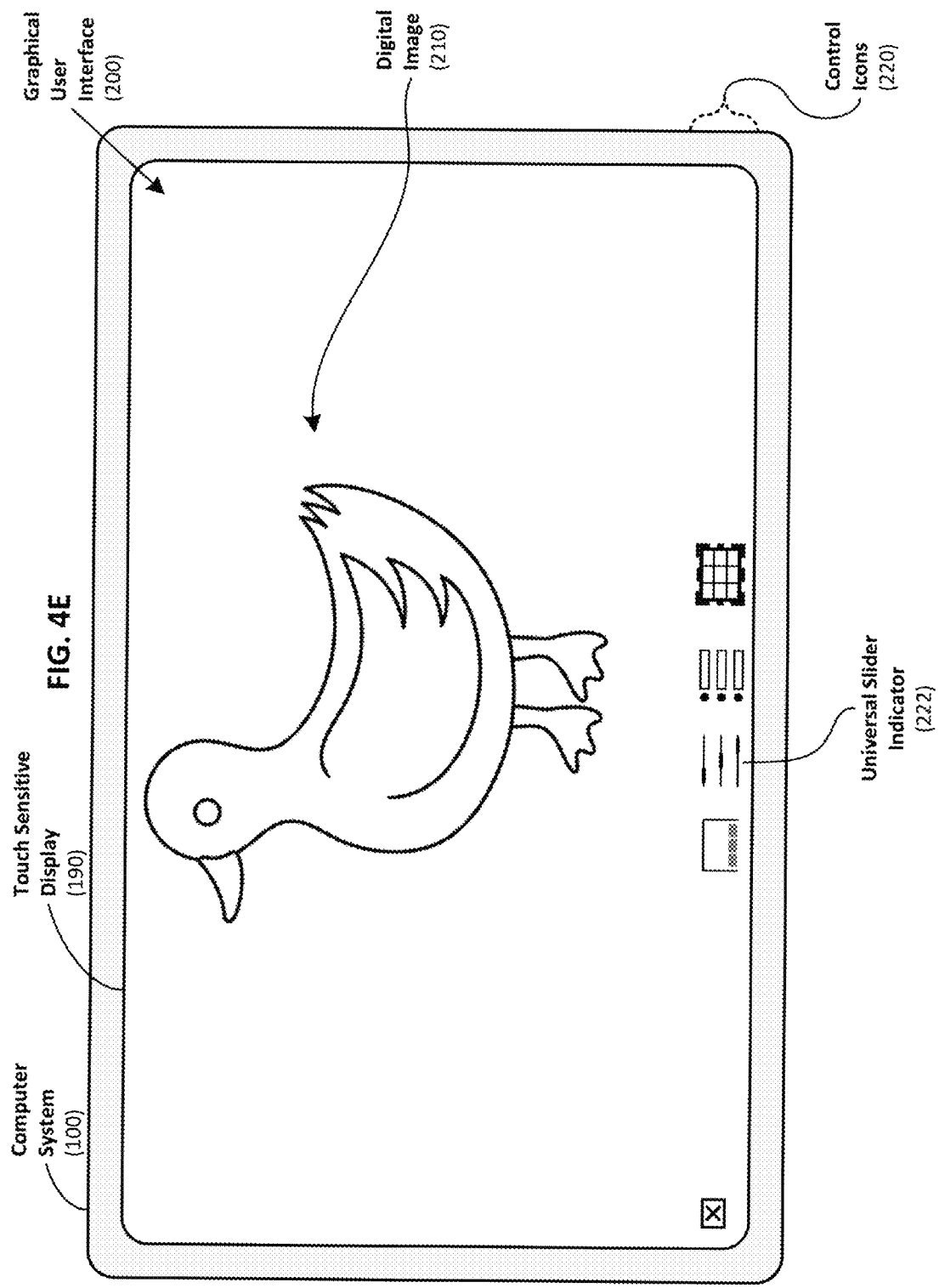
FIG. 4E illustrates an example graphical user interface configured for use with digital image processing software executing on a device with a touch sensitive display, the interface including a universal slider indicator that toggles the display of a universal slider, wherein the universal slider is not displayed.

In certain applications a user may wish to hide control tiles 230 but retain the ability to manipulate universal slider 240. Doing so would further increase the portion of the display available for displaying digital image 210 while still providing the user with the ability to manipulate the image 210. In such applications the user may perform a single-tap gesture on tile display icon 221. See single-tap gesture E in FIG. 4C. In particular, tile display icon 221 can be configured to function as an on/off toggle switch for the display of control tiles 230. The result of performing such a gesture is illustrated in FIG. 4D, wherein control tiles 230 are no longer visible, but universal slider 240 remains visible and fully functional. In similar fashion, universal slider indicator 222 can be configured to function as an on/off toggle switch for the display of universal slider 240. For example, the user may perform a single-tap gesture on universal slider indicator 222. See single-tap gesture F in FIG. 4D. The result of performing such a gesture is illustrated in FIG. 4E, wherein universal slider 240 is no longer visible. In other embodiments display of universal slider 240 can be toggled off by deselecting a control tile associated with a numerical value, for example by performing a second single-tap gesture on a selected control tile. A second single-tap gesture can be distinguished from a double-tap (reset) gesture by determining whether or not the second gesture is detected within a predetermined threshold time period of the first gesture. In general, it will be appreciated that display of control tiles 230 and universal slider 240 can be toggled independent of each other, such that in other embodiments universal slider 240 can be removed from display while control tiles 230 remain visible.

As described herein, how the various embodiments respond to selection of a control tile may depend on the particular type of tile that is selected. FIGS. 4A through 4D illustrate selection of a control tile that corresponds to a numerical parameter that can be adjusted across a range of values, for example using universal slider 240. In other applications a control tile may correspond to a parameter, tool, or imaging effect that can be toggled on and off. One such example is an Auto Tone tool that automatically sets values for exposure, contrast, highlights, shadows, whites, and blacks for a given image. Other examples include imaging effects which can be toggled on an off, such as a sepia effect, a vintage effect, or a halftone effect. Where a control tile is associated with such a parameter, the corresponding setting shown on the control tile may indicate "on" or "off", "active" or "inactive", or any other suitable selection indicator. For instance, the example embodiment illustrated in FIG. 4B includes an Auto Tone control tile set to "Off". In this case, the setting can be toggled with a simple tapping gesture. See reference numeral 1422 in FIG. 3. In some cases the selection of a control tile associated with a toggle selection also automatically causes the setting to be toggled. However, in alternative embodiments both a first selection gesture and a second toggle gesture are used to toggle the setting. In this case, the first and second gestures may or may not comprise the same type of gesture.

Figure 6A:
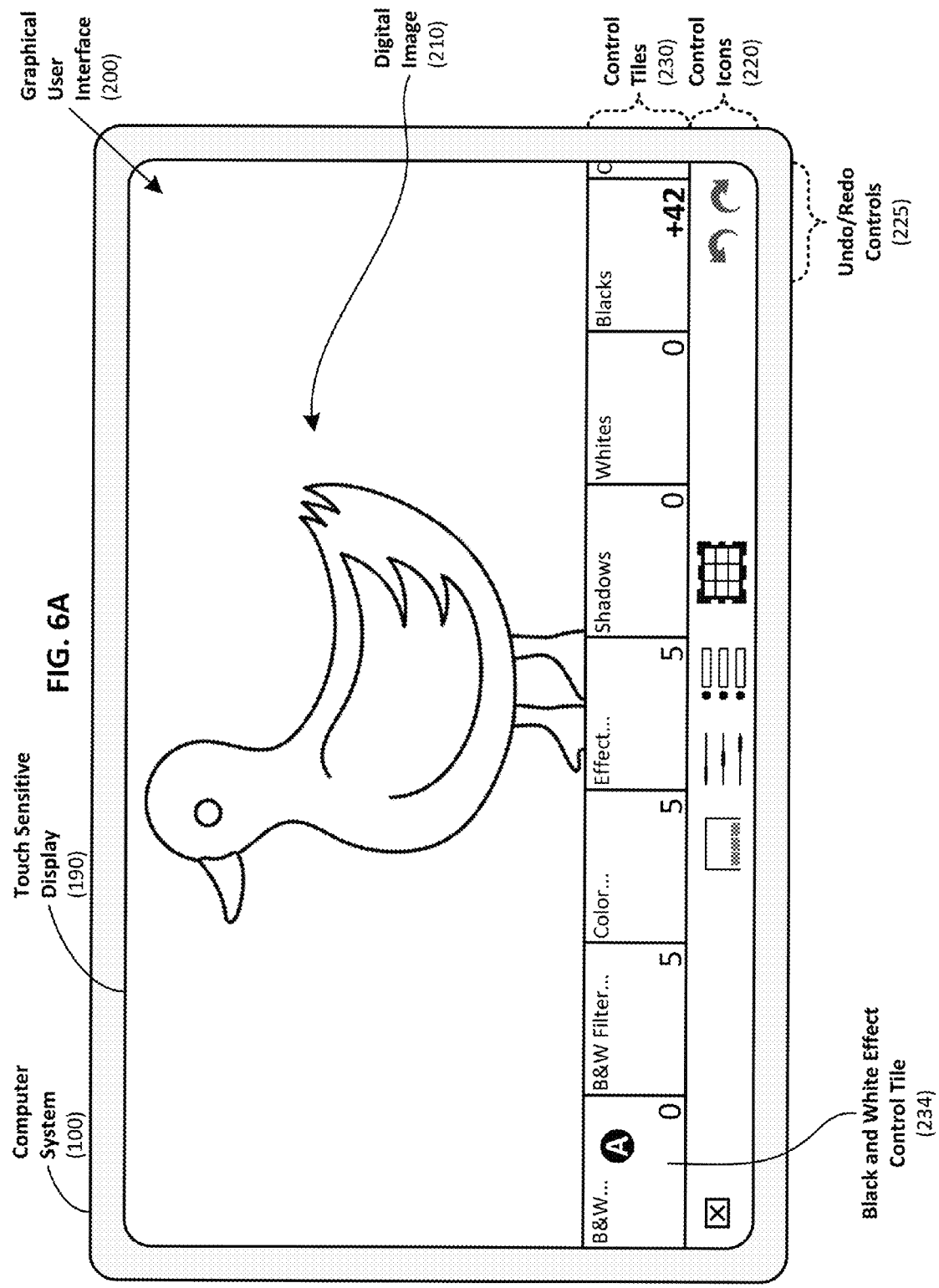
FIG. 6A illustrates an example graphical user interface configured for use with digital image processing software executing on a device with a touch sensitive display, the interface including a black and white effect control tile that provides access to a selection of black and white imaging effects.
Figure 6B:
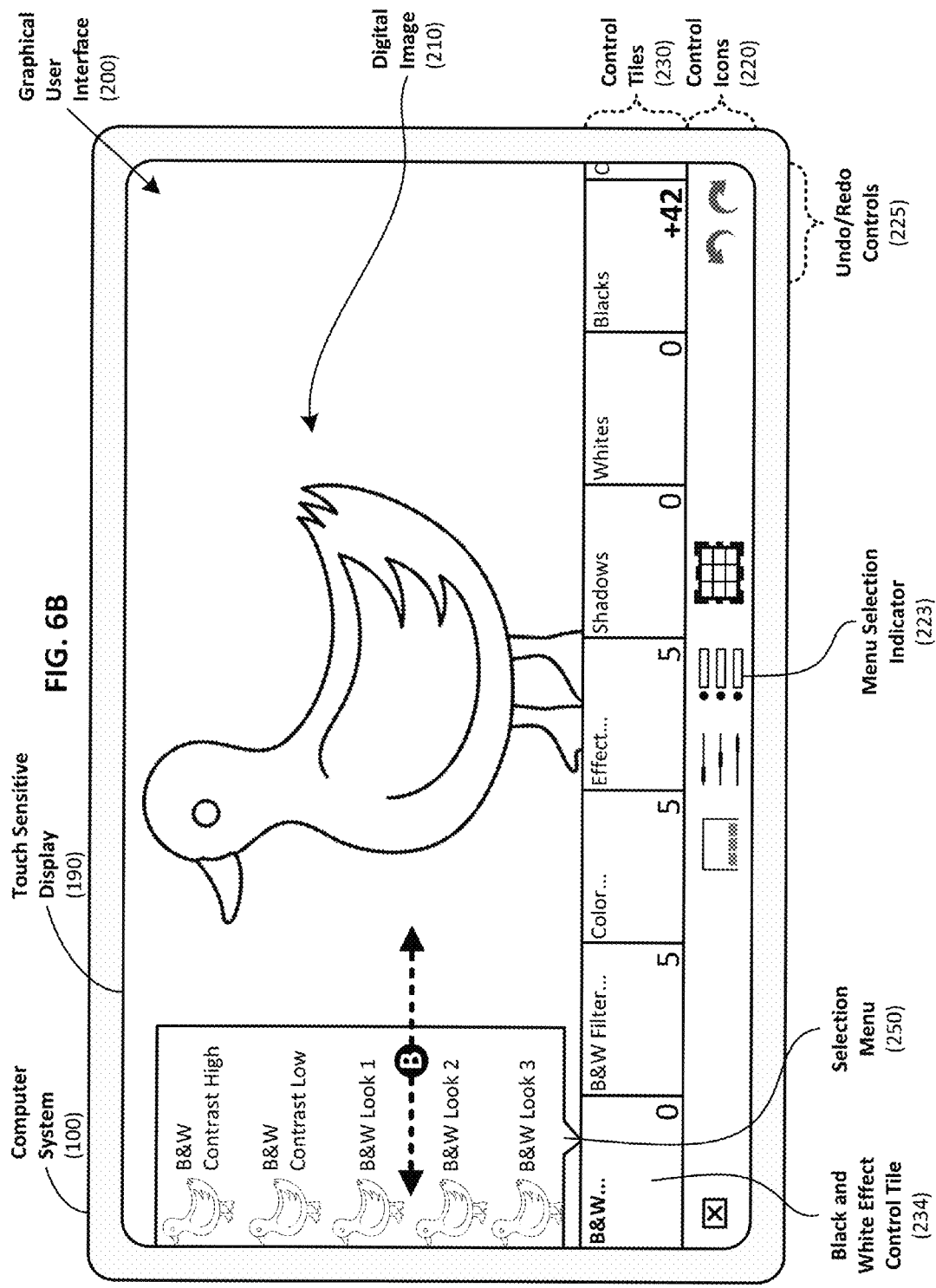
FIG. 6B illustrates an example graphical user interface configured for use with digital image processing software executing on a device with a touch sensitive display, the interface including a black and white effect selection menu that demonstrates a plurality of black and white imaging effects.

In certain embodiments a control tile may be associated with a plurality of options which may be selected from a menu of available options. In this case, selecting such a control tile causes a selection menu to be displayed. See reference numeral 1424 in FIG. 3. For example, FIG. 6A illustrates selection of a black and white effect control tile 234 using a single-tap gesture A. The result of performing such a gesture is illustrated in FIG. 6B, wherein a selection menu 250 is displayed above the selected black and white effect control tile 234. In addition, a menu selection indicator 223 is highlighted, emphasized, or otherwise indicated as having been activated. Selection menu 250 includes a listing of imaging effects and an optional image preview that allows the user to better understand how application of a given effect will change the appearance of digital image 210. An imaging effect that is listed in menu 250 can be selected with a taping gesture or with another selection input. Thus it will be appreciated that selection menu 250 provides yet another way to receive user input regarding a modification that is to be applied to digital image 210. See reference numeral 1428 in FIG. 3. Once this input is received, image manipulation module 168 can be used to manipulate digital image 210 accordingly. See reference numeral 1440 in FIG. 3. As in other embodiments, undo/redo controls 225 enable to user to undo and/or redo imaging modifications applied via selection menu 250.

Figure 6C:
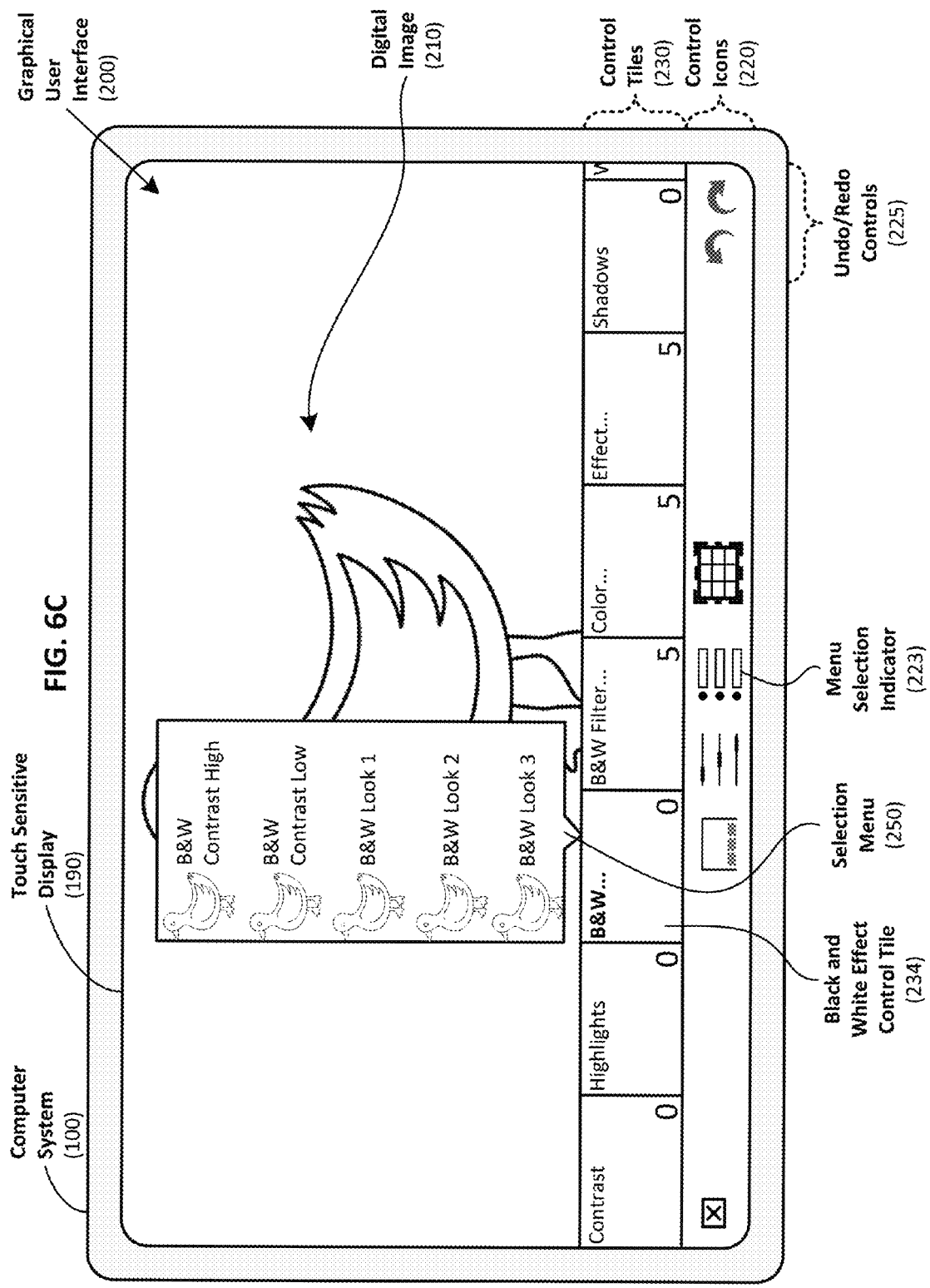
FIG. 6C illustrates an example graphical user interface configured for use with digital image processing software executing on a device with a touch sensitive display, the interface including a black and white effect selection menu that has been horizontally scrolled with respect to the position illustrated in FIG. 6B.

Just as control tiles 230 can be moved with a left- or right-swipe gesture on the rotatable carousel, selection menu 250 provides another location where a left- or right-swipe gesture causes the carousel to rotate. See left- or right-swipe gesture B in FIG. 6B. The result of performing such a gesture is illustrated in FIG. 6C, wherein both control tiles 230 and selection menu 250 have scrolled to the right. In a modified embodiment selection menu 250 can be configured to be at least partially transparent such that digital image 210 remains at least partially visible regardless of the position of selection menu 250. In either case, selection menu 250 can be understood as being attached to, and moving with, the control tile with which its associated.

Referring again to FIG. 3, another type of user input that may be received via the rotatable carousel is a default setting restoration command. More specifically, in certain embodiments the user may perform a double-tap gesture to indicate that a parameter associated with a particular control tile should be restored to a default setting. See reference numeral 1430 in FIG. 3. In other embodiments one or more other gestures can be associated with such a command, such as a multiple-finger tap gesture. In still other embodiments an image restoration command is associated with a dedicated control tile, thereby allowing multiple image modification operations to be undone at once. Such a restoration command optionally provides the ability to reset the image appearance to a selected one of a variety of different restoration points, such as to the point the image was opened in a particular work session, to the point the image was imported to a particular library, to a state before a set number of operations, or to a state prior to a certain type of operations. In any event, regardless of the particular gesture used to invoke the default setting restoration command, certain of the embodiments disclosed herein can be configured to restore the selected parameter to a default or initial setting in response to such a command. This provides the user with an easy way to reset particular aspects of an image modification, thereby eliminating or reducing any need for the user to manipulate a control slider or other user interface elements to this end.

In certain embodiments one or more control tiles provide access to image cropping and resizing functionality. FIG. 7A illustrates that such functionality can be accessed by performing a single-tap gesture on, or otherwise selecting, a crop icon 224. See single-tap gesture A in FIG. 7A. The result of performing such a gesture is illustrated in FIG. 7B, in which a plurality of aspect ratio control tiles 236 are displayed, each of which indicates an aspect ratio which can be applied to digital image 210. Although not specifically illustrated in FIG. 7B, in a modified embodiment one of the plurality of aspect ratio control tiles 236 is configured to allow a user-defined aspect ratio to be specified. FIG. 7B also illustrates that selecting crop icon 224 causes a crop frame 260 to be overlaid on digital image 210, wherein crop frame 260 can be used to provide additional image manipulation functionality. For example, crop frame 260 can be resized or rotated to further define the size and/or orientation of digital image 210. Once selected, crop icon 224 is optionally configured to be highlighted, emphasized, or otherwise indicated as having been activated.

Performing a single-tap gesture on, or otherwise selecting, one of the plurality of aspect ratio control tiles 236 causes the corresponding aspect ratio to be applied to digital image 210. See single-tap gesture B in FIG. 7B. In particular, the selected aspect ratio can be applied to digital image 210 by adjusting the size and shape of crop frame 260. Thus, for example, selecting a 1×1 aspect ratio control tile 236 would cause crop frame 260 to have a square-shaped appearance. Selecting a particular aspect ratio control tile 236 also causes the appearance of the corresponding control tile label to be adjusted accordingly, such as by being displayed in a bold typeface. This indicates to the user that a particular aspect ratio control tile 236 has been selected. For instance, as illustrated in the example embodiment of FIG. 7C, selection of the "3×2" aspect ratio control tile 236 causes a 3×2 aspect ratio to be applied to digital image 210, and causes the label for the 3×2 aspect ratio control tile 236 to be displayed in a bold typeface.

Figure 7C:
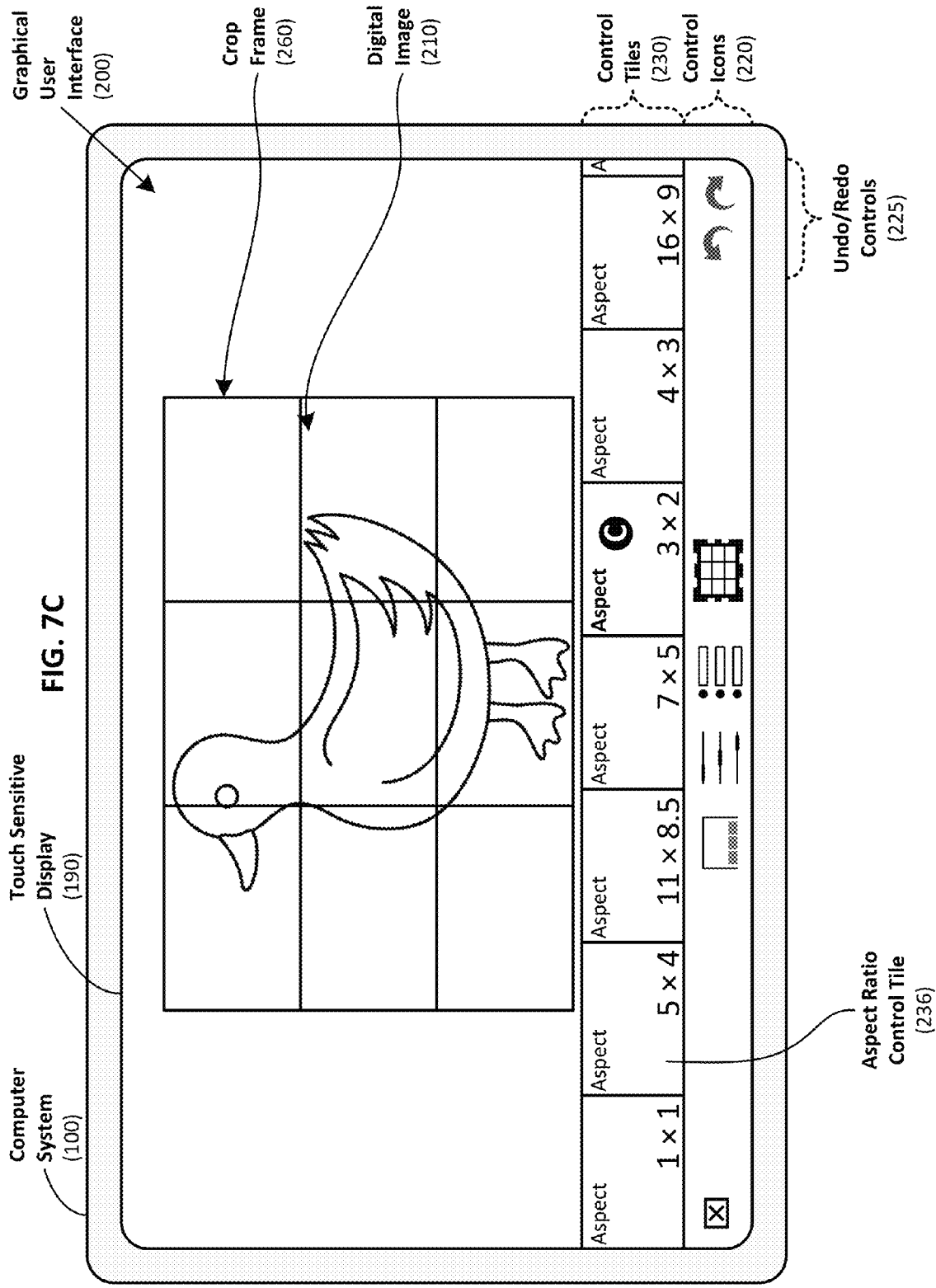
FIG. 7C illustrates an example graphical user interface configured for use with digital image processing software executing on a device with a touch sensitive display, the interface including a selected 3×2 aspect ratio control tile.

In certain embodiments a selected aspect ratio can be transposed by performing another single-tap-gesture on, or otherwise selecting again, a previously-selected aspect ratio control tile 236. See single-tap gesture C in FIG. 7C. The result of performing such a gesture is illustrated in FIG. 7D, wherein the 3×2 aspect ratio crop frame 260 has been modified to have a 2×3 aspect ratio, and wherein the value associated with selected aspect ratio control tile 236 has been modified to indicate a 2×3 aspect ratio instead of a 3×2 aspect ratio. In addition, the updated aspect ratio value ("2×3") is provided in a bold typeface, thus indicating that this ratio has been modified from its original default value. The graphical user interface 200 is configured to display portions of digital image 210 that fall outside the modified crop frame 260 with an altered appearance, such as a greyed-out appearance, thus indicating that such portions have been cropped from the original image.

As disclosed herein, in certain embodiments control icons 220 comprise tile display icon 221, universal slider indicator 222, menu selection indicator 223, crop icon 224, and undo/redo controls 225. Additional, fewer, or alternative control icons can be used in other embodiments. For instance, in one embodiment a settings icon provides access to configuration settings that can be used to adjust the appearance and operation of graphical user interface 200. Example configuration settings include the size of control tiles 230, the transparency of control tiles 230, the scale of universal slider 240, and textual appearance settings of the various labels that appear on control tiles 230. In certain embodiments one or more of control icons 220 may be hidden when inactive or otherwise nonfunctional in a given use context. For example, undo/redo controls 225 can be configured to disappear when no modifications are available to be undone or redone.

CONCLUSION

The various embodiments disclosed herein provide a number of advantages over existing digital image processing software applications. For example, using a single universal slider to manipulate a variety of different imaging parameters allows the limited screen area associated with many portable computing devices to be used more efficiently. When a universal slider is used with a rotatable carousel of control tiles as described herein, this combination provides a spatially efficient way to access a wide range of digital image processing functionality while still allowing a substantial portion of the display to be devoted to displaying the digital image itself. In addition, these features also provide a user interface that works well in both perspective and landscape orientations, and that is not biased toward either left- or right-handed use. Many of the embodiments disclosed herein can be implemented without conventional user interface elements such as menu bars, scroll bars, okay/cancel buttons, and window elements, all of which tend to consume a substantial portion of the limited screen area that is available on many portable computing devices. Other embodiments can be implemented with partially transparent user interface elements, such as a partially transparent universal slider. By allowing more screen area to be devoted to the display of the a digital image, users gain a better understanding of how various imaging effects change the appearance of an image. In addition, simplifying how a user interacts with image manipulation software make functionality often associated with desktop software applications easily accessible to users of portable devices. Furthermore, allowing a user to access image manipulation functionality from the same interface that is used to view a digital image provides a non-modal interface that eliminates or reduces the need for a user to navigate through various combinations of menus and dialog boxes to access functionality.

Numerous variations and configurations will be apparent in light of this disclosure. For instance one example embodiment provides a method for modifying the appearance of a digital image, the method comprising displaying a digital image on a touch sensitive display. The method further comprises displaying a plurality of control tiles along a horizontal axis of the touch sensitive display. The plurality of control tiles are arranged on a rotatable carousel. The method further comprises receiving a first selection of a first control tile from among the plurality of control tiles. The first selection comprises a first gesture that is detected using the touch sensitive display. The method further comprises, in response to the first selection, displaying a universal slider along a horizontal axis of the touch sensitive display. Input received via the universal slider causes a first imaging parameter associated with the digital image to be modified. The method further comprises receiving a second selection of a second control tile from among the plurality of control tiles. The second selection comprises a second gesture that is detected using the touch sensitive display. The method further comprises modifying the digital image by applying input received via the universal slider to a second imaging parameter associated with the second control tile. In some cases the universal slider is positioned adjacent to the rotatable carousel. In some cases the universal slider is at least partially transparent, thereby allowing at least a portion of the digital image to be viewable through the universal slider. In some cases the method further comprises removing the rotatable carousel from the touch sensitive display without removing the universal slider. In some cases the method further comprises removing the rotatable carousel from the touch sensitive display without removing the universal slider, wherein the digital image is modified by applying input received via the universal slider to the second imaging parameter after the rotatable carousel is removed from the touch sensitive display. In some cases each of the plurality of control tiles comprises a parameter label and a parameter setting. In some cases the method further comprises displaying a second plurality of control tiles on the rotatable carousel in response to detection of a directional swipe gesture on the rotatable carousel. In some cases the method further comprises performing a rearrangement of at least one of the universal slider and the rotatable carousel in response to rotation of the touch sensitive display, wherein the rearrangement comprises positioning at least one of the universal slider and the rotatable carousel along a horizontal axis of the rotated touch sensitive display. In some cases the rotatable carousel is positioned along a bottom edge of the touch sensitive display. In some cases (a) each of the plurality of control tiles displays a parameter setting; and (b) input received via the universal slider causes one of the parameter settings to change.

Another example embodiment of the present invention provides a system for manipulating a digital image, the system comprising an image display module configured to render a digital image on a touch sensitive display. The system further comprises a tile display module configured to render a plurality of control tiles on the touch sensitive display. Each control tile is associated with an image manipulation functionality. The system further comprises a slider display module configured to render a universal slider in response to selection of a control tile that is associated with a defined range of values. The system further comprises an image manipulation module configured to modify the digital image based on user input received via at least one of a selected control tile and the universal slider. In some cases the system further comprises a menu display module configured to render a popup menu in response to selection of a control tile that is associated with a plurality of imaging effects, wherein (a) the plurality of control tiles are displayed on a rotatable carousel; and (b) the popup menu is anchored to the rotatable carousel, such that rotation of the rotatable carousel results in corresponding movement of the popup menu. In some cases the system further comprises a menu display module configured to render a popup menu in response to selection of a control tile that is associated with a plurality of imaging effects. In some cases the tile display module is configured to render the plurality of control tiles along a horizontal axis of the touch sensitive display. In some cases the plurality of control tiles are displayed using a rotatable carousel that is configured to display a second plurality of control tiles in response to a directional swipe gesture. In some cases the image display module is further configured to render a modified digital image on the touch sensitive display based on modifications made to the digital image by the image manipulation module. In some cases the image display module is configured to display clipped portions of the digital image with a modified color, wherein the clipped portions of the digital image are based on a determination that clipping has occurred as a result of modifications made in response to the received user input.

Another example embodiment of the present invention provides a computer program product encoded with instructions that, when executed by one or more processors, causes a process for modifying a digital image to be carried out. The process comprises displaying a digital image on a touch sensitive display. The process further comprises displaying a plurality of control tiles along a horizontal axis of the touch sensitive display. The process further comprises receiving a first selection of a first control tile from among the plurality of control tiles. The first control tile is associated with a first imaging parameter. The process further comprises, in response to the first selection, displaying a universal slider along a horizontal axis of the touch sensitive display. The process further comprises modifying the digital image based on first user input received via the universal slider. The first user input corresponds to a change in the first imaging parameter. The process further comprises receiving a second selection of a second control tile from among the plurality of control tiles. The second control tile is associated with a second imaging parameter. The process further comprises modifying the digital image based on second user input received via the universal slider. The second user input corresponds to a change in the second imaging parameter. In some cases each of the plurality of control tiles includes a parameter value that is rendered in a bold typeface when a corresponding imaging parameter has been modified from a default value. In some cases the process further comprises displaying a crop frame over the digital image, wherein the crop frame has an aspect ratio corresponding to selection of a third control tile.

The foregoing detailed description has been presented for illustration. It is not intended to be exhaustive or to limit the disclosure to the precise form described. Many modifications and variations are possible in light of this disclosure. Therefore it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system for manipulating a digital image, the system comprising:
   one or more processors;
   a memory that is coupled to the one or more processors;
   a touch sensitive display coupled to the one or more processors;
   an image display module stored in the memory that, when executed using the one or more processors, is configured to render a digital image on the touch sensitive display;
   a tile display module stored in the memory that, when executed using the one or more processors, is configured to render a plurality of control tiles on the touch sensitive display, wherein each control tile is associated with an image manipulation functionality;
   a slider display module stored in the memory that, when executed using the one or more processors, is configured to render a universal slider in response to selection of a first control tile that is associated with a range of values;
   an image manipulation module stored in the memory that, when executed using the one or more processors, is configured to modify the digital image based on user input received via the universal slider; and
   a menu display module stored in the memory that, when executed using the one or more processors, is configured to render a popup menu in response to selection of a second control tile that is associated with a plurality of imaging effects, wherein the plurality of control tiles are displayed on a rotatable carousel, and wherein the popup menu is anchored to the rotatable carousel, such that rotation of the rotatable carousel results in corresponding movement of the popup menu.

2. The system of claim 1, wherein rotation of the rotatable carousel occurs in response to detection of a directional swipe gesture on the popup menu.

3. The system of claim 1, wherein the popup menu includes a plurality of preview images, each corresponding to one of the plurality of imaging effects.

4. The system of claim 1, wherein the tile display module is configured to render the plurality of control tiles along a horizontal axis of the touch sensitive display.

5. The system of claim 1, wherein the rotatable carousel is configured to display a second plurality of control tiles in response to a directional swipe gesture.

6. The system of claim 1, wherein the image display module is further configured to render a modified digital image on the touch sensitive display based on modifications made to the digital image by the image manipulation module.

7. The system of claim 1, wherein the image display module is configured to display clipped portions of the digital image with a modified color, wherein the clipped portions of the digital image are identified based on a determination that clipping has occurred as a result of modifications made in response to the received user input.

8. A method for manipulating a digital image, the method comprising:
   causing display of a digital image on a touch sensitive display;
   causing display of a plurality of control tiles on the touch sensitive display, wherein each control tile is associated with an image manipulation functionality;
   causing display of a universal slider on the touch sensitive display in response to selection of a first control tile that is associated with a range of values;
   modifying the digital image based on user input received via the universal slider; and
   causing display of a popup menu on the touch sensitive display in response to selection of a second control tile that is associated with a plurality of imaging effects, wherein the plurality of control tiles are displayed on a rotatable carousel, and wherein the popup menu is anchored to the rotatable carousel, such that rotation of the rotatable carousel results in corresponding movement of the popup menu.

9. The method of claim 8, wherein the rotatable carousel rotates in response to detection of a directional swipe gesture on the popup menu.

10. The method of claim 8, wherein the popup menu includes a plurality of preview images, each corresponding to one of the plurality of imaging effects.

11. The method of claim 8, wherein the plurality of control tiles are displayed along a horizontal axis of the touch sensitive display.

12. The method of claim 8, wherein the rotatable carousel is configured to display a second plurality of control tiles in response to a directional swipe gesture.

13. The method of claim 8, further comprising causing display of a modified digital image on the touch sensitive display in response to modification of the digital image based on the user input received via the universal slider.

14. The method of claim 8, further comprising displaying clipped portions of the digital image with a modified color, wherein the clipped portions of the digital image are identified based on a determination that clipping has occurred as a result of modifying the digital image based on the user input received via the universal slider.

15. A non-transitory computer readable medium having instructions encoded thereon that, when executed by one or more processors, causes a process for modifying a digital image to be carried out, the process comprising:
   causing display of a digital image on a touch sensitive display;
   causing display of a plurality of control tiles on the touch sensitive display, wherein each control tile is associated with an image manipulation functionality;
   causing display of a universal slider on the touch sensitive display in response to selection of a first control tile that is associated with a range of values;
   modifying the digital image based on user input received via the universal slider; and
   causing display of a popup menu on the touch sensitive display in response to selection of a second control tile that is associated with a plurality of imaging effects, wherein the plurality of control tiles are displayed on a rotatable carousel, and wherein the popup menu is anchored to the rotatable carousel, such that rotation of the rotatable carousel results in corresponding movement of the popup menu.

16. The non-transitory computer readable medium of claim 15, wherein the rotatable carousel rotates in response to detection of a directional swipe gesture on the popup menu.

17. The non-transitory computer readable medium of claim 15, wherein the popup menu includes a plurality of preview images, each corresponding to one of the plurality of imaging effects.

18. The non-transitory computer readable medium of claim 15, the process further comprising causing display of a modified digital image on the touch sensitive display in response to modification of the digital image based on the user input received via the universal slider.

19. The non-transitory computer readable medium of claim 15, the process further comprising displaying clipped portions of the digital image with a modified color, wherein the clipped portions of the digital image are identified based on a determination that clipping has occurred as a result of modifying the digital image based on the user input received via the universal slider.

20. The non-transitory computer readable medium of claim 15, wherein the plurality of control tiles are displayed along a vertical axis of the touch sensitive display.

* * * * *